(12) United States Patent
Mayer et al.

(10) Patent No.: US 10,808,740 B2
(45) Date of Patent: Oct. 20, 2020

(54) BONDING OBJECTS TOGETHER

(71) Applicant: Woodwelding AG, Stansstad (CH)

(72) Inventors: Jörg Mayer, Niederlenz (CH); Mario Lehmann, Les Pommerats (CH); Joakim Kvist, Nidau (CH); Patricia Poschner, Uettligen (CH)

(73) Assignee: WOODWELDING AG, Stansstad (CH)

( * ) Notice: Subject to any disclaimer, the term of this patent is extended or adjusted under 35 U.S.C. 154(b) by 469 days.

(21) Appl. No.: 15/564,623

(22) PCT Filed: Jul. 5, 2016

(86) PCT No.: PCT/EP2016/065781
§ 371 (c)(1),
(2) Date: Oct. 5, 2017

(87) PCT Pub. No.: WO2017/005722
PCT Pub. Date: Jan. 12, 2017

(65) Prior Publication Data
US 2018/0094660 A1    Apr. 5, 2018

(30) Foreign Application Priority Data

Jul. 9, 2015 (CH) ...................................... 1000/15

(51) Int. Cl.
*B23B 7/00* (2006.01)
*F16B 5/04* (2006.01)
(Continued)

(52) U.S. Cl.
CPC ............... *F16B 5/04* (2013.01); *B21J 15/025* (2013.01); *B21J 15/08* (2013.01); *B21J 15/147* (2013.01);
(Continued)

(58) Field of Classification Search
CPC ........ B21J 15/025; B21J 15/08; B21J 15/147; B21J 15/285; B21J 15/36; B29C 65/562;
(Continued)

(56) References Cited

U.S. PATENT DOCUMENTS

| 5,415,714 A | 5/1995 | Altmann et al. |
| 2014/0356053 A1* | 12/2014 | Urayama ............ B29C 65/3616 403/270 |

FOREIGN PATENT DOCUMENTS

| DE | 30 16 590 | 11/1981 |
| EP | 0 634 675 | 1/1995 |

(Continued)

OTHER PUBLICATIONS

International Preliminary Report on Patentability dated Jan. 9, 2018 (Jan. 9, 2018), Application No. PCT/EP2016/065781, 10 pages.

*Primary Examiner* — James D Sells
(74) *Attorney, Agent, or Firm* — Rankin, Hill & Clark LLP

(57) ABSTRACT

A method of bonding a connector to a first object includes providing the first object and the connector, the connector extending between a proximal end and a distal end and has a connector body that forms a distally facing punching edge. At least one of the connector and of the first object includes a thermoplastic material in a solid state. The method further includes driving the connector into the first object and coupling mechanical vibration into the connector until the connector extends through a portion of the first object from a proximal side to a distal side thereof and material of the first object is punched out by the connector body, and until at least a flow portion of the thermoplastic material becomes flowable and flows relative to the first object and the connector body while the connector body remains solid. Thereafter, the thermoplastic material is allowed to re-solidify.

60 Claims, 9 Drawing Sheets

(51) Int. Cl.
    *B29C 65/64*      (2006.01)
    *F16B 19/08*      (2006.01)
    *B29C 65/00*      (2006.01)
    *B29C 65/56*      (2006.01)
    *B21J 15/14*      (2006.01)
    *B21J 15/36*      (2006.01)
    *B21J 15/08*      (2006.01)
    *B21J 15/02*      (2006.01)
    *B21J 15/28*      (2006.01)
    *F16B 11/00*      (2006.01)

(52) U.S. Cl.
    CPC ............. *B21J 15/285* (2013.01); *B21J 15/36* (2013.01); *B29C 65/562* (2013.01); *B29C 65/645* (2013.01); *B29C 66/742* (2013.01); *F16B 19/086* (2013.01); *B29C 66/1122* (2013.01); *B29C 66/21* (2013.01); *B29C 66/41* (2013.01); *B29C 66/721* (2013.01); *B29C 66/727* (2013.01); *B29C 66/81423* (2013.01); *B29C 66/81429* (2013.01); *B29C 66/8322* (2013.01); *B29C 66/83221* (2013.01); *B29C 66/92443* (2013.01); *B29C 66/92445* (2013.01); *B29C 66/92921* (2013.01); *F16B 11/006* (2013.01)

(58) Field of Classification Search
    CPC ..... B29C 65/645; B29C 65/08; B29C 66/742; F16B 5/04; F16B 19/086
    USPC ........................................................ 156/73.1
    See application file for complete search history.

(56) References Cited

FOREIGN PATENT DOCUMENTS

| | | |
|---|---|---|
| EP | 2 796 272 | 10/2014 |
| FR | 2112523 | 6/1972 |
| JP | 2013-59770 | 4/2013 |
| WO | 03/046390 | 6/2003 |

\* cited by examiner

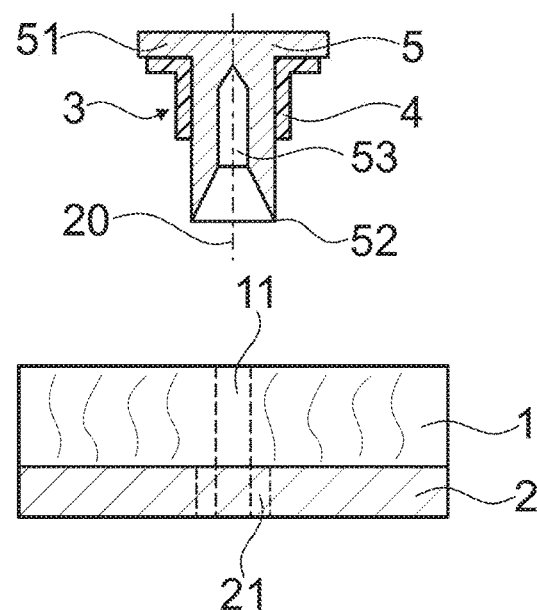
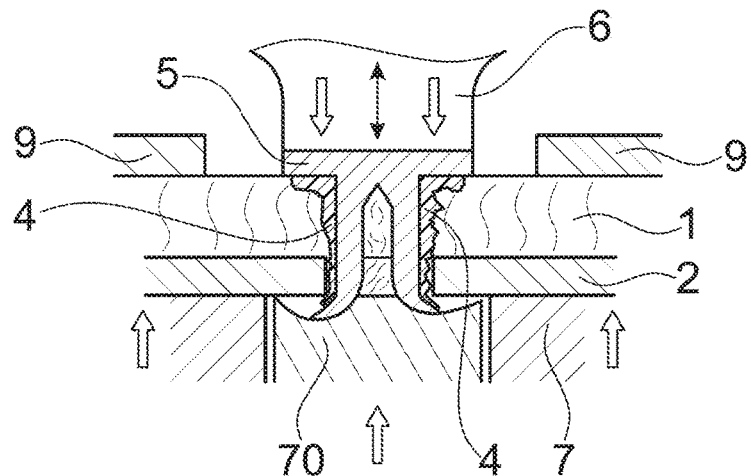
Fig. 1a
Fig. 1b
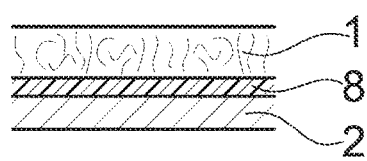 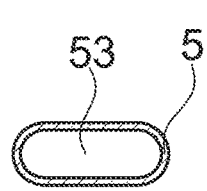 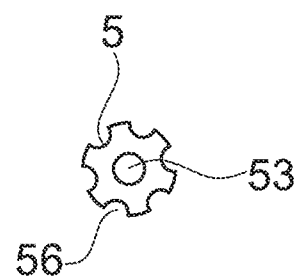
Fig. 2  Fig. 3  Fig. 4

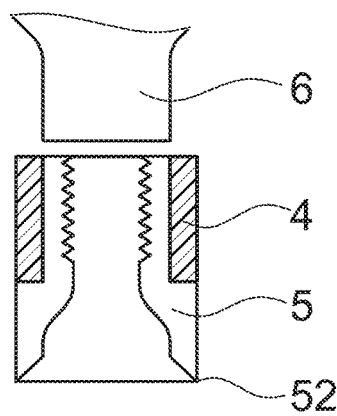
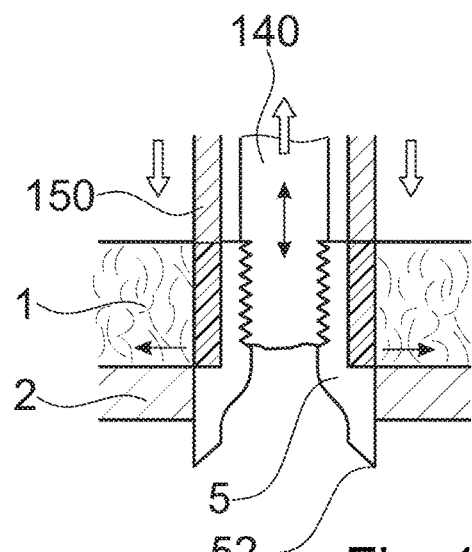
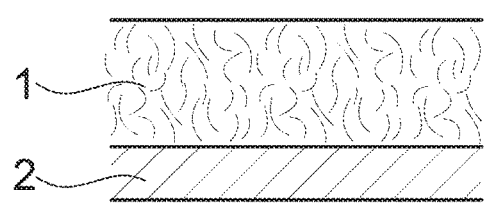
Fig. 18a
Fig. 18b
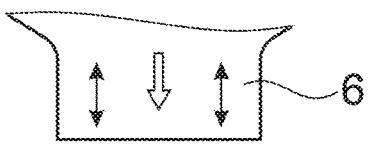
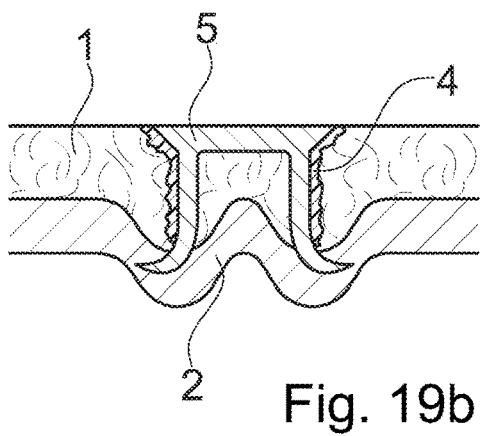
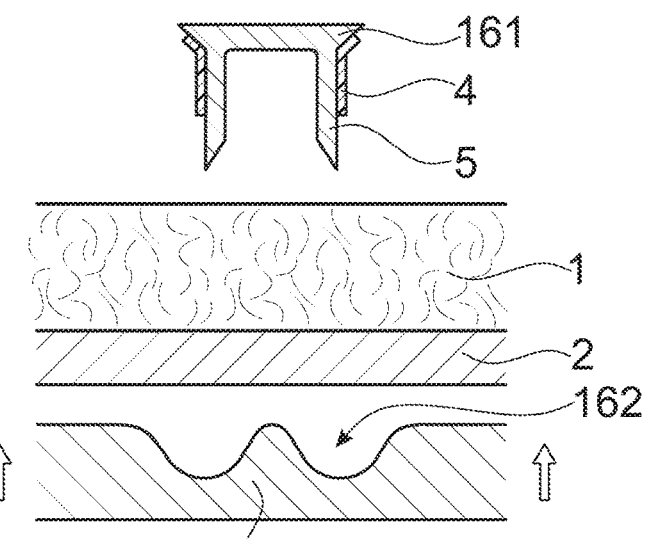
Fig. 19a
Fig. 19b

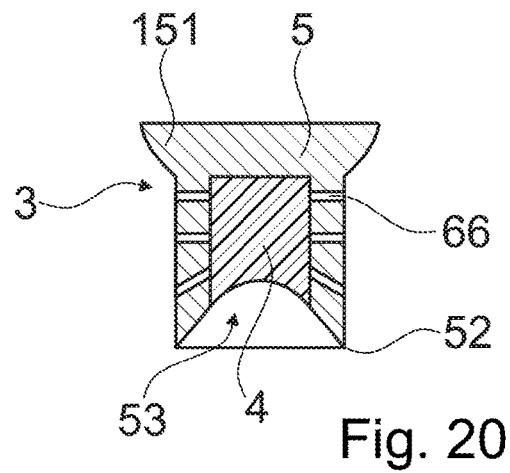
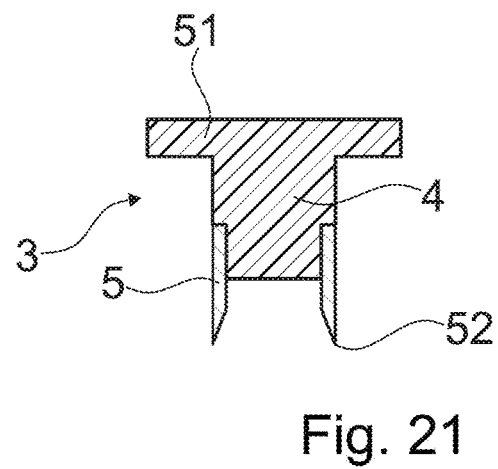
Fig. 20
Fig. 21
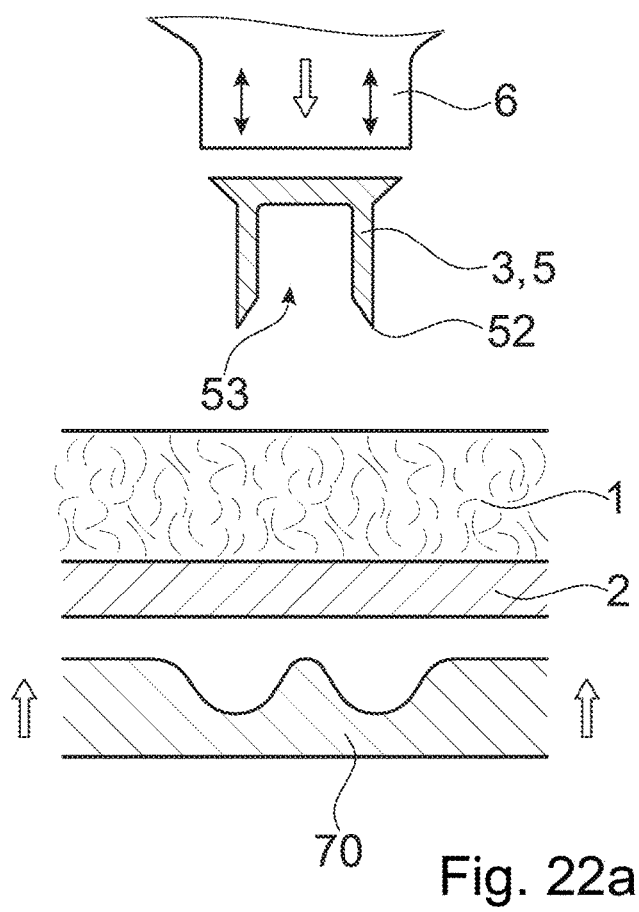
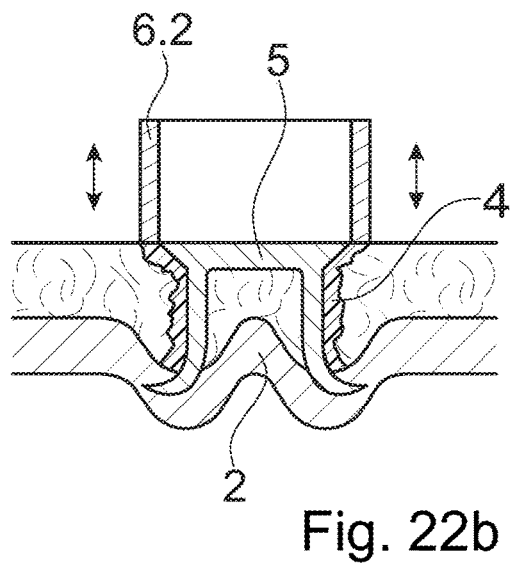
Fig. 22a
Fig. 22b

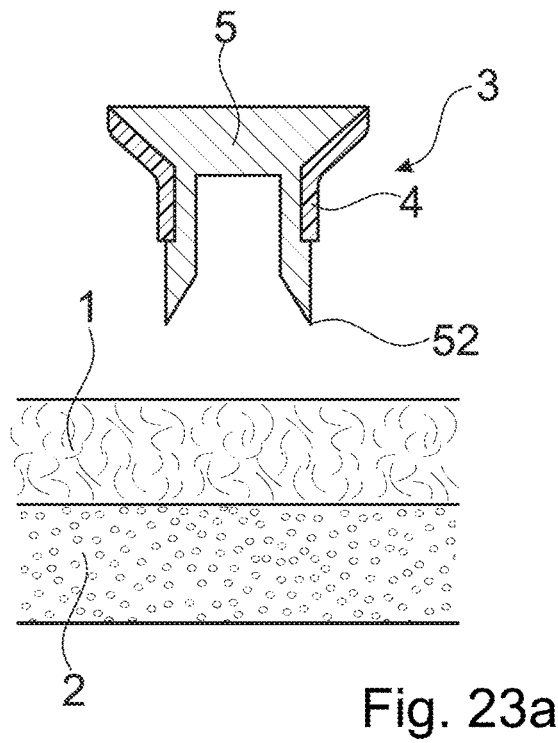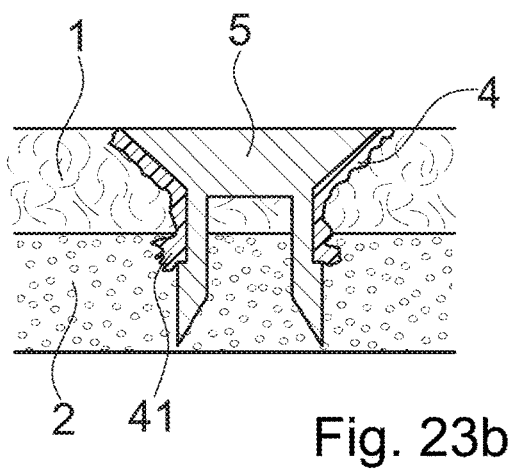
Fig. 23a  Fig. 23b
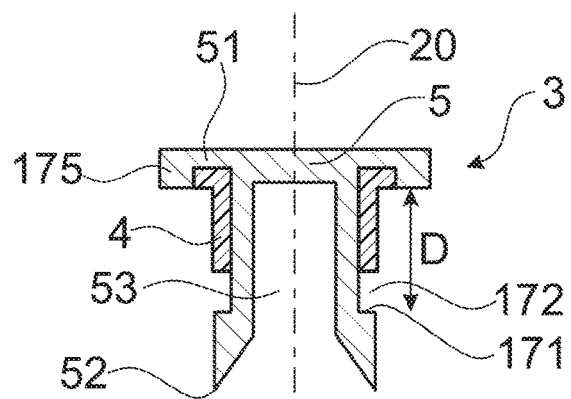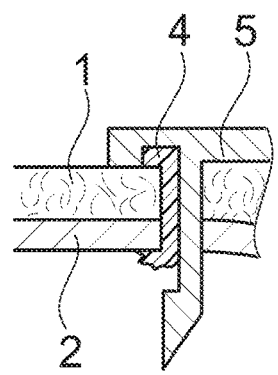
Fig. 24a  Fig. 24b

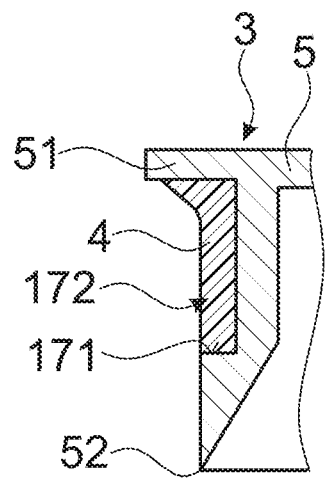 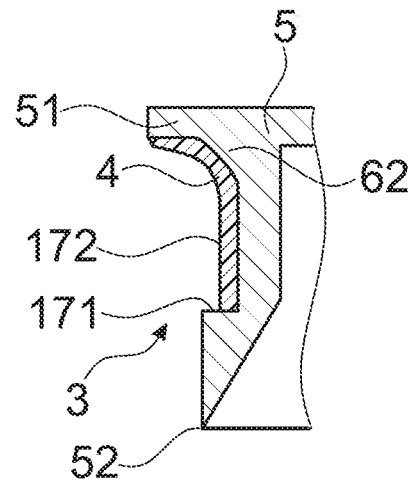 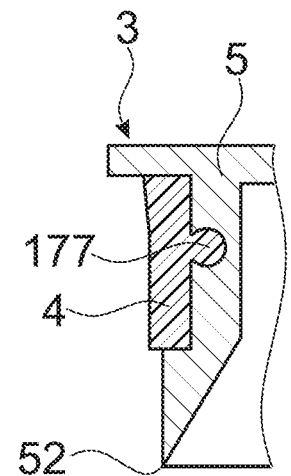
Fig. 25　　　　　Fig. 26　　　　　Fig. 27
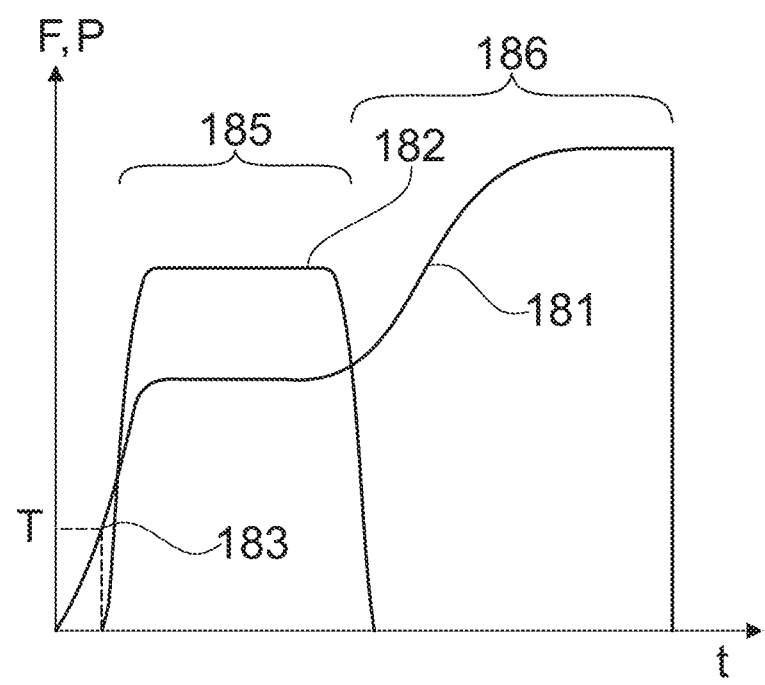
Fig. 28

BONDING OBJECTS TOGETHER

BACKGROUND OF THE INVENTION

Field of the Invention

The invention is in the fields of mechanical engineering and construction, especially mechanical construction, for example automotive engineering, aircraft construction, shipbuilding, machine construction, toy construction etc.

Description of Related Art

In the automotive, aviation and other industries, there has been a tendency to move away from steel constructions and to use lightweight material such as aluminium or magnesium metal sheets or die-cast parts, or carbon fiber reinforced polymers instead.

The new materials cause new challenges in bonding elements of these materials—especially of bonding flattish objects (such as panels or boards) together or bonding a flattish object and an other object together, such as bonding a flattish object to an other object, or bonding a connector to a flattish object.

Difficulties especially arise if objects of different materials are to be connected, such as two materials of the group including steel, aluminium, magnesium, fiber composites, especially carbon fiber composites or glass fiber composites—together.

Conventional rivet connections with metallic rivets firstly suffer from the drawback that the electrochemical potential of some of these materials is strongly different with differences corresponding to several volts, so that there will be substantial galvanic corrosion. Rivets from stainless steel that partially solve the problem are firstly expensive, and secondly only austenitic stainless steel can be used, which material has a limited hardness and strength.

Also, connections involving flat parts of fiber reinforced polymers suffer from the additional drawback that the out-of-plane Young's modulus of these materials is very low, and the friction force arising from the compression of the parts between the rivet head and rivet foot does not substantially contribute to the mechanical stability of the connection. (In this text, generally the broadening at the end from which the rivet is accessed for a deformation process is called "head", whereas the broadening at the other, distal end is called "foot". In literature, often both ends of the rivet are called 'heads'.)

It has been proposed to use a lacquer on metallic rivets to electrically insulate the metallic rivets from the object they are bonded to. However, lacquer may become brittle over time, especially when subject to long-time mechanical wear due to vibration, or it can dissolve.

To solve these problems, the automotive, aviation and other industries have started heavily using adhesive bonds. Adhesive bonds can be light and strong but suffer from the disadvantage that there is no possibility to long-term control the reliability, since a degrading adhesive bond, for example due to an embrittling adhesive, is almost impossible to detect without entirely releasing the bond. Also, the so-called "crash worthiness" (i.e. the capability of absorbing energy without undergoing total failure in the event of a crash) of adhesive bonds is only minimal, in contrast to rivet connections especially of composite materials, because of the capability of a rivet to horizontally move through the composite material thereby absorbing energy.

As a further limitation of manufacturing processes for example in the automotive industry, the adhesives of choice do not bond immediately after their deposition. Rather, the parts undergo an Electrophoretic Deposition (EPD) step, especially cathodic EPD step for pointing and anti-corrosion protection. During this step, the parts are immersed in a dip of liquid that is kept at an elevated temperature. Only during this step, the adhesives become fully effective. However, during this step, substantial forces act on the parts. Thus, an additional, preferably low-cost initial mechanical bond should be made.

SUMMARY OF THE INVENTION

It is an object of the present invention to bond a (mechanical) connector to an object the method overcoming drawbacks of prior art methods.

It is another object of the present invention to provide a low-cost and efficient method of bonding a connector to an object or bonding, by such a connector, two objects together.

It is an other object of the present invention to provide a method of bonding two objects together with a mechanical connector, the method overcoming drawbacks of prior art methods and being especially suited for bonding objects together that so far could not be bonded by metallic rivets due to corrosion and other problems.

It is a further object to provide equipment for carrying out the method.

According to an aspect of the invention, a method of bonding a connector to a first object includes:
  providing the first object and the connector, the connector being separate from the first object, the connector extending between a proximal end and a distal end and including a connector body, the connector body forming a distally facing punching edge, wherein at least one of the connector and of the first object (i.e. the connector or the first object or both) includes a thermoplastic material in a solid state,
  Driving the connector into material of the first object and coupling mechanical vibration into the connector, until the connector extends through a portion of the first object from a proximal side to a distal side thereof and material of the first object is punched out by the connector body, and until at least a flow portion of the thermoplastic material becomes flowable and flows relative to the first object and the connector body (for example at an interface between the connector and the first object) while the connector body remains solid, and
  Causing the thermoplastic material to re-solidify.

In this, the first object may especially include an essentially flat, sheet-like portion, with the connector after the step of driving it into the material of the first object extending through the sheet-like portion from one broad side to the other broad side thereof. As an alternative, it is not excluded that the portion through which the connector extends does not have a full thickness of the first object in a region around the connector but that the distal end of the connector reaches into a hollow space of the object, especially forming an undercut.

The approach according to the aspect of the invention has the advantage of providing a process that is quick and low-cost by providing a connector that has essentially the function of a punch rivet. Mechanically deformable connectors, especially plastically deformed metal rivets, including punch rivets, have been known in the art for a very long time. However, due to the combination of a for example metallic (or ceramic or hard plastic or glass etc.) body with the approach of liquefying the thermoplastic material and causing it to re-solidify, the advantages of the material properties of the non-liquefiable material, such as high shear force resistance, high ductility, or also, depending on the application, other properties like electrical conductivity etc. may be used. Nevertheless the disadvantages of prior art punch rivets are avoided. Not only may the thermoplastic material provide a shield against contacts that may bring about corrosion. The thermoplastic material that has flown and re-solidified also has the potential of preventing or curing possible delamination effects. Also, the thermoplastic material may contribute to avoiding adverse effects like the "spring back effect".

It has further been observed that punching assisted by ultrasound has the effect of reducing delamination and reducing the extent of a damage zone around the punching location.

Further, using the thermoplastic material may have one or a combination of the following effects:
 low force, no overpressing, and with that no bulging effect of the sheet material in between different connectors,
 minimal residual stresses reducing the risk for stress induced enhanced aging and corrosion cracking, especially if it is used in combination with a glue at the overlapping sheet material faces,
 compensating for tolerances, e.g. if the second object has through holes,
 if the thermoplastic component of the connector has a glass transition temperature below 160° C. it may also be able to compensate for thermal stresses during the Electrophoretic Deposition (EPD) process in automotive applications.

The first object may include non-liquefiable material. For example, it may consist of non-liquefiable material. As an alternative, it may include a reinforcement structure embedded in a matrix of the thermoplastic material (or one of the thermoplastic materials). In embodiments, the first object may be a fiber composite including fibers, for example of carbon or glass, embedded in a polymer matrix, for example a matrix of a thermosetting polymer or, as mentioned, in a thermoplastic matrix. It is also possible, that the first object includes another polymer-based material, for example by consisting of a polymer material (thermoplastic or thermosetting, including elastomeric), or by including a particle reinforced polymer, for example a polymer embedding metallic and/or ceramic reinforcements. It is further also possible that the first object is metallic or of a wood-based material, such as a wood-plastic-composite, particle board etc., or of any other material that is capable of being punched by a punching device.

The connector body will be of a material that does not become flowable (is not liquefiable) under the conditions that apply during driving the connector into material of the first object and coupling mechanical vibration into the connector. It may especially be metallic or of a ceramic material.

In this, the connector body of the not liquefiable material is different from a mere filler of a large number of particles but is a macroscopic body with a defined position and orientation and of a substantial size of for example at least 10% of a connector volume, and/or with a characteristic dimension of at least 0.1 mm in any dimension. Especially, the body may be such as to have a defined shape and to thereby add stiffness to the connector. In embodiments with the connector including the thermoplastic material, the connector is defined into at least two defined spatially separated regions, namely the body region and the thermoplastic region.

The body may encompass additional functionalities, e.g. nut or thread, through hole, male or female connection feature, and/or may be part of a functional part that is fixed to the first material by one or several connectors.

In the step of positioning, relative to the first object, also a second object may be arranged, with the connector in the step of being driven into material of the first object also being driven into or through the second object or an opening therein to connect the first and second objects to each other. Especially, the connector, for example the connector body, may be caused to be expanded distally of a portion of more distal of the objects and or within the more distal of the objects so as to form a foot portion, thereby connecting the first and second objects to each other in a rivet-like manner.

More in general, the method may include forming a foot portion by causing a distal portion especially of the connector body (in certain embodiments in addition or as an alternative of the thermoplastic material) to expand distally of and/or within the first object (if the connector is anchored in a single object) or distally of and/or within the more distal of the objects to form a rivet foot securing the connector in a positive-fit like manner to the object or objects and/or securing the objects to each other.

For the purpose of forming such a foot portion, especially of the connector body, a counter element in the form of a riveting die may be used.

Techniques of causing a punch rivet foot portion to be formed are known from literature. As an example, it is referred to the book by Ortwin Hahn et al, EFB-Forschungsbericht NR. 180, *Entwicklung der kombinierten Fügetechnik für Hybridbauweisen am Beispiel Stanznietkleben, Europäische Forschungsgesellschaft für Blechverarbeitung e.V.* Hannover, 2002, especially the introductory chapters, such as on pages 15-27.

A second object of the mentioned kind may be of any one of the materials or material compounds mentioned hereinbefore referring to the first object. Especially, the second object may be metallic. It may for example be a metal sheet or a sheet portion of a metal profile or metal frame or similar. In this, the second object may be of a die-cast metal, such as die-cast magnesium or die-cast aluminum, or it may be of steel, etc. The second object and/or the first object may be a part of a complex item such as a car body.

The first and second objects may especially each include a sheet portion, with the sheet portions of the first and second objects in the step of positioning being positioned to lie against each other (directly, or with a layer of other material in-between).

Especially, the second object may be arranged distally of the first object (for complexly shaped objects this condition meaning that the one portion of the second object through which the connector is driven is placed distally of the one portion of the first object through which the connector is driven).

The first and second objects may be made of different materials. It is also possible that they are of a same material. In a special example, the first object includes a fiber composite, and the second object is also of a fiber compound or is metallic.

The second object may include a through opening through which the connector is driven (for example without additional resistance coming from the second object) during the process, or such opening may be punched into the second object by the connector body in the process.

Especially embodiments in which the second object includes a ductile material—such as a metal, for example steel or aluminum or magnesium—the connector body instead of being driven through the second object may merely be driven into the second object.

In embodiments in which this is the case and in which a foot portion is formed, such a foot portion is thus formed within material of the second object. This process for conventional punch rivets has, for example, been described in the hereinbefore referenced book by Hahn et al.

In embodiments, in addition or as an alternative to a purely mechanical, positive-fit connection a material connection such as a cold weld or a hot weld may bond the connector to the second object.

For the flow portion of the thermoplastic material, one or any combination of the following may apply:

The portion may shield at least in part the connector body from material of the first object. For example, material of the flowing portion may be caused do coat a circumferential wall of the opening in the first object that has been made by the punching at least along a full circumference. In examples, the portion is arranged so as to fully shield the connector body from the first object. Especially, if the flow portion may cause a galvanic separation between the connector body and the first object (or between the connector body and a portion of the first object, such as a carbon fiber reinforcement).

The method includes deforming the connector body and the flow portion, after re-solidification stabilizes the deformed state of the connector. Thereby due to the approach of "freezing" flown thermoplastic material (by causing it to re-solidify), the connector is adapted in its shape to the shape of the object(s) in a relaxed state, without any re-setting forces. This is in contrast to, for example, metallic rivets where in any deformation there is an elastic portion, and as soon as the deforming force stops, the deformed part will tend to a slight movement away from the object (spring back effect) against which it is pressed. In connections of metal rivets to a metal object, this is solved by over-pressing the deformed rivet part into the metal to which it is connected, resulting in a further connection and considerable residual stresses in the rivet and/or the sheet material. However, this is not an option for, for example, non-metallic objects. Due to the approach according to the here-discussed embodiments of the invention, this problem is solved, and an intimate connection between the object and the connector results independent of the material properties of the object. Any re-setting force by a metallic body of the connector may only act within the connector and does not have any influence on the connection.

The portions may, by having flown into structures of the first object or along the first object (for example distally of the first object or, if applicable, second object), lock the connector to the first object/second object in a positive-fit manner. Especially, in embodiments the portions may form, after re-solidification, a foot portion or a part of a foot portion anchoring the connector in the first object/assembly of first and second objects in a rivet-like manner. Therein, the connection between the connector and the object(s) may include a macroscopic positive-fit connection, in which the structures cooperating with the flow portion to form the positive-fit connection are macroscopic and well-defined. For example, the positive-fit connection may be caused by the thermoplastic material forming a foot portion distally of a mouth of the opening through the first/second object, which opening may in embodiments have been caused by the punching. In addition or as an alternative, the connection may include a microscopic positive-fit connection in which the thermoplastic material penetrates into a porosity or other inhomogeneity of the material in which anchoring takes place.

The step of coupling mechanical vibration into the connector may be carried out simultaneously with driving the connector into material of the first object, and/or it may be carried out thereafter. If the mechanical vibration is coupled into the connector while it is driven into the material of the first object, the mechanical vibration will influence and possibly assist the punching process. Also, heat will be generated thereby. This heat may contribute to the process of making the flow portion of the thermoplastic material to become flowable. In embodiments, it may be even sufficient for making the flow portion to become flowable, whereby no separate heat needs to be caused by friction between the thermoplastic material and one of the objects. Alternatively, heat generated by friction between the thermoplastic material and the first object, the second object (if applicable) and/or, if the connector includes several parts, between parts of the connector may be the cause or contribute to the cause of making the flow portion flowable.

In embodiments, at least the connector includes the thermoplastic material.

In such embodiments (and also in embodiments in which the thermoplastic material initially belongs to the first object), the flow portion is caused to flow along a periphery (with respect to radial directions) of the connector body and in and/or into between the connector body and the first object material (and/or possibly the second object material).

For example, the thermoplastic material may form a collar around the connector body, with the depth (the axial extension) for example corresponding to at least a thickness of the first object.

In embodiments that include the first and the second object, the first and second objects may be of different materials. Especially, they may be of different materials having substantially different coefficients of thermal expansion α.

According to the prior art, such connections between objects of different coefficients of thermal expansion were primarily achieved by blind rivets or by gluing. Blind rivets are technically rather complex. Further, both, blind rivets and glue connections feature the substantial disadvantage that they have a very limited suitability to compensate for shear loads that arise if the objects connected react differently to temperature changes due to different coefficients of thermal expansion. For example, the coefficient of thermal expansion of Aluminum is $\alpha_{Al}=2*10^{-5}$ K, whereas the coefficient of thermal expansion of a typical CFK (carbon fiber reinforced composite) may even have the opposite sign: $\alpha_{CFK}=-5*10^{-6}$ K. For example, in industrial manufacturing processes sub-assemblies after the assembly process often undergo a cathodic electrodeposition (or other immersion bath) process, which will take place at an elevated temperature of for example about 180° C. For this reason, in industrial manufacturing, objects that after being assembled with each other are subject to an electrodeposition process will, in addition to being bonded by an adhesive connection, also be secured to each other by a (blind) rivet. When subject to temperature changes, for example during the electrodeposition process, this will lead to deformation around the rivet connection, and hence to empty spaces between the objects and the rivet. After electrodeposition, the deposited coating is not yet hardened, so that the full load caused by different thermal expansion is on the rivet, leading to substantial friction forces along the opening in which the rivet is placed. During the process, the deposited substance hardens and thereby freezes mechanical stress caused by the rivet.

The approach according to the present invention provides a possible solution to this problem. Especially, the connector body may include a distal punching edge portion and proximally thereof a narrowing (for example waist) where the outer diameter (or more general: the outer dimension, in a cross section perpendicular to the axis) is reduced compared to the distal narrowing. Especially, the punching edge formed at the distal end may have a position radially more outward than the outer surface of the connector body at the axial position of the narrowing. An axial extension of the narrowing may, for example, be such that at the end of the process, the portion with the narrowing fully transverses the first object or the second object or both. Thereby, the opening in the first object (and possibly in the second object) punched out by the punching edge portion has a larger cross section than the portion with the narrowing, the difference of the cross section areas constitutes a tolerance range that may take up differences in thermal expansion, both, during the above-mentioned manufacturing process and during use.

In embodiments, a narrowing of this kind is provided with a collar of the thermoplastic material around the connector body, with the depth (the axial extension) for example corresponding to at least a thickness of the first object. Thereby, such a collar serves as a kind of dilatation ring preventing any damage by the connector body loading the first object. Especially, in embodiments of this kind, the thermoplastic material that forms the collar may be comparably soft at the use temperature and have a substantial elasticity. It may for example belong to the category of thermoplastic elastomers.

In embodiments, in which the step of positioning includes positioning a second object distally of the first object, in the step of being driven into material of the first object, the connector may also be driven through the second object to yield a second object opening. Then, the method may include preventing the connector body from being clamped by the second object after it has been driven through the second object. To this end, for example the step of driving the connector into the assembly of the first and second object with mechanical vibration acting may include moving the connector to a position where a rim of the second object opening is adjacent a narrowing of the above-described kind.

In embodiments (with or without the thermoplastic material forming a collar of the mentioned kind), therefore, a narrowing distally of a punching edge portion may be designed so that its position and axial extension is sufficient for the portion with the narrowing to fully transverses the second object.

By this, a further possible object is achieved: Namely, especially if the second object has some elasticity—for example if it is metallic—, a direct, force transmitting contact between the connector body and the second object could lead to mechanical vibration energy being coupled into the second object via the connector. This may cause a loss of efficiency, because a second object of a metal or other comparable material will tend to conduct the vibration away to more remote locations where they may be absorbed instead of causing the desired liquefaction process of the thermoplastic material.

Because of the approach with the narrowing distally of the punching edge portion, however, the situation where the connector body is clamped by the edge of the for example metallic second object around the punched-out opening is avoided. Rather, the connector body may vibrate freely.

The transition between the punching edge portion and the narrowing may be step-like, i.e. the connector body may include a proximally facing shoulder between the punching edge portion and the portion of the narrowing. Alternatively, the transition may be smooth. The narrowing may form a waist between the punching edge portion and a head or other more proximal portion. It may alternatively extend to the proximal end of the connector body. Then, the thermoplastic material portion may directly be accessible from the proximal side.

In alternative configurations, the thermoplastic material is arranged in an indentation or in a plurality of indentations along a periphery of the connector body. Also in these configurations, an axial extension may correspond to at least a thickness of the first object (in fact, this optional condition for the axial extension may hold independent of how exactly the thermoplastic material is configured). A radial extension of the thermoplastic material may correspond to at least a radial extension of the punching edge. If at least a portion of the thermoplastic material is placed in an indentation, the thermoplastic material is prevented from being sheared by the forces that apply when the connector is moved into material of the objects, especially if the material is comparably hard, strong and/or ductile.

Generally, the mechanical vibration energy absorbed during the process is used for causing the flow portion of the thermoplastic material to become flowable. The absorption of the mechanical vibration energy may be Directly in contact with the thermoplastic material, by causing a relative vibrational movement at an interface between the thermoplastic material and a non-liquefiable material (for example of the first/second object); and/or Indirectly, via the connector body and/or material of the first/second object.

In addition or as an alternative, also internal friction within the thermoplastic material may contribute to the liquefaction, this being of importance especially for comparably soft thermoplastic materials or after the thermoplastic material, for example due to indirect heating, has been brought to a comparably high temperature, especially above its glass transition temperature (for amorphous polymers).

For the indirect absorption, it may be sufficient to carry out the step of driving the punching edge into the material while vibration is coupled into the connector. The heat generated during the punching process may then be conducted to the thermoplastic material that is liquefied as a consequence.

For direct absorption, a certain relative force between the thermoplastic material and the non-liquefiable may be advantageous. To this end, one or a combination of the following may apply:

The thermoplastic material extends radially somewhat further than the punching edge so that if it is pressed into the punched opening further friction with the lateral walls of the punched opening is caused. (this may be combined with providing the thermoplastic material in the above-mentioned indentations to avoid a shearing-off of the thermoplastic material).

The connector may, proximally of the shearing edge be slightly tapered so that the radial extension gradually increases where the thermoplastic material is to be in contact with walls of the punched opening.

The material of the first object may be chosen to include a certain resilience. For example, if it is a fiber composite material, after punching due to the fiber reinforcement, portions of the first object will have a tendency to be forced back into the opening, leading to friction with portions of the connector that are proximally of the punching edge.

The connector may be caused to be spread.

In a first example, this is caused by a separate spreading element against which the connector is pressed.

In a second example, the connector body may have an inner hollow space open to the proximal side for accommodating the punched-out material, which hollow space is under-dimensioned. Thereby, punched-out material of the first object causes a spreading of a connector body portion surrounding the inner hollow space.

In an even further example the connector body may be caused to be spread by a riveting die being correspondingly shaped to cause a spreading.

Combinations of these mechanisms are readily possible. A radial, distal spreading in fact is a part of a classical punch riveting process as described in the above-referenced book by Hahn et al., and it is often caused by a combination of the pressure generated in the hollow space and the effect of the riveting die.

This spreading will also lead to friction between the lateral walls of the punched opening and portions of the connector.

The connector includes a plurality of connector parts,

For example, the connector body may include a plurality of connector body parts, wherein the step of driving the connector into material of the first object includes driving the first connector body part into material of the first object, and wherein the step of coupling mechanical vibration into the connector includes pressing, for example by a different tool, the second connector body part against the first connector body part and/or the first object while the mechanical vibration is coupled into the second connector body part and/or the first connector body part until the flow portion of the thermoplastic material becomes flowable. At the end of the process, the first and second connector body parts may optionally be fastened to each other.

Another example is the hereinbefore mentioned separate anchoring element.

In an even further alternative, the thermoplastic material is part of an anchoring element that is initially separate from the connector body. Such anchoring element may for example include a thermoplastic portion that is pressed into a longitudinal opening accessible from the proximal side and connected to the periphery by at least one exit opening through which the flow portion is pressed out. Such exit opening(s) may be lateral. This "inside-out" approach of pressing thermoplastic material out from a longitudinal opening is in principle also possible for embodiments in which the thermoplastic material is already initially in the opening as a thermoplastic filling instead of belonging to a separate part.

A similar "inside-out" effect may also be caused if the thermoplastic material is in the hollow space that is open to the distal side if this hollow space is connected to the periphery by at least one exit opening.

A sonotrode for applying the vibrations may then be shaped to be pressable against the proximal end face of the thermoplastic material and to have a distal end portion insertable into the longitudinal opening to press the thermoplastic material further into the longitudinal opening and out of the lateral opening (exit opening).

In addition or as an alternative, the thermoplastic material may initially belong to the first object. Especially, the thermoplastic material may be a thermoplastic matrix of a fiber composite. It has been found that up to fiber contents of about 40% (volume percent), the thermoplastic material of the first object may be sufficient, making additional thermoplastic material of the connector optional.

Generally, pertaining to various embodiments of the invention, the flow portion of the thermoplastic material is the portion of the thermoplastic material that during the process and due to the effect of the mechanical vibrations is caused to be liquefied and to flow. In some of the embodiments of the method in which the thermoplastic material belongs to the connector, all thermoplastic material of the connector may be caused to flow, i.e. the flow portion is the entire thermoplastic material. In other embodiments, the process parameter—especially the time during which energy in the form of mechanical vibrations is coupled into the arrangement—may be chosen so that not all thermoplastic material is liquefied.

Initially, the first object may be provided without any pre-drill, i.e., the surface extends essentially perpendicularly or at an average angle of for example at most 60° to the proximodistal axis; the surface will often be continuous, for example flat, but stepped configurations are not excluded.

In such embodiments without any pre-drill, the opening in which the connector extends through a portion of the first material is made by the punching.

The punching edge of the connector body may be formed by a blade-like portion of the connector body. For example, the connector body may have an essentially tube-shaped distal portion, ending in a circumferential edge that forms the punching edge, whereby the tube wall forms the blade. Alternatively, such a tube-shaped portion may have interruptions in the form of axially running slits, thereby making deformations of the distal end (for example to form the foot) easier. Also configurations with stepped blades etc. are possible.

As an alternative to having a blade-like portion it is not excluded that the connector body is essentially bolt-shaped with a flat distal end face (and hence without the hollow space) but with a sharp distal peripheral edge of the bolt forming the punching edge.

In addition to the punching edge, the connector body may include a proximal head portion shaped to define a relative position of the connector and a proximal surface of the first object and preventing distal movements of the connector relative to the first object after it has reached this position by resting against a proximally facing surface portion of the first object.

In embodiments in which the method includes providing two objects, the connector body will be arranged such that it traverses, after the process, the shear plane between the first and second objects. If the first and second objects in the vicinity of the openings do not directly rest against each other, this implies that the shaft traverses both, the plane defined by the surface of the first object next to the opening and facing towards the second object and the plane defined by surface of the second object next to the opening and facing towards the first object.

Due such arrangement, together with a head portion and, if necessary, a foot portion of the discussed kind, in these embodiments the connector fulfills the function of a rivet. It can secure the first and second objects together by one or more of the following mechanisms:

The shaft portion traversing the shear plane between the objects secures the objects against shear movements.

The head portion and the foot portion or other structures preventing a pulling-out of the second object cause the first and second objects to rest against each other.

Depending on the chosen material, the securing together by the head and foot portions may be under some stress so that an interference fit of the first and second objects, causing further resistance against shear movements results.

In embodiments, the connector body can have a cross section that is different from circular. Then, the connector also secures against rotational movements.

Between the first and second objects, a further bond may be applied, for example an adhesive bond.

In addition or as an alternative to securing at least two objects (the first and second objects) together, the connector may also serve at least one further purpose.

An example of such further purpose is the purpose of serving as an anchor for attaching other objects. To this end, the body of the not liquefiable material may have a portion accessible from an outside, such as a rod with a thread or a rod serving as part of another mechanical connection, or an opening with an inner thread (nut rivet) or other mechanical connection, etc.

The fit between the connector and the first and (if applicable) second objects may optionally include a weld. In accordance with a first option, such a weld may be a weld between the thermoplastic material (of the connector) and a thermoplastic matrix material, for example of the first object. In addition or as an alternative, according to a second option a metal weld, such as a cold weld, may be caused between the connector body and for example the second object.

In addition or as an alternative, a thermoplastic separating layer between the first and second object may be present. Such a separating layer may be provided as a coating of one or both of the objects or additionally or alternatively as separate foil. It may among others have the advantage that it defines a galvanic separation of the first and second objects, beneficial for example if these objects are both of electrically conducting, but different materials. In such a case, it may be advantageous to perform the method in a manner that the separating layer welds to the thermoplastic material of the connector. For example, a weld between these may be continuous around a full periphery of the connector so that a complete seal is formed. This may be a good protection against corrosion for example due to saltwater to which the connection may be exposed.

In accordance with a special, "rearward", configuration, connector body also serves as the sonotrode, which is used to apply the vibrations to the thermoplastic material of the connector. In this configuration, the sonotrode is subject to a pulling force when the flow portion is made flowable. To this end, the sonotrode will include a shaft reaching past or through the thermoplastic connector material, with a distal, proximally-facing coupling out face in contact with a distally-facing distal coupling-in face of the thermoplastic connector material. Further, a distal end of the sonotrode will include the punching edge. By serving as the connector body, such a sonotrode after the step of applying the vibrations remains part of the connector.

A sonotrode for applying the vibrations may then be shaped to be pressable against the proximal end face of the thermoplastic material and to have a distal end portion insertable into the longitudinal opening to press the thermoplastic material further into the longitudinal opening and out of the lateral opening (exit opening).

The invention also concerns a connector for being used in embodiments of the above-discussed method, the connector including a thermoplastic material and a connector body of a material that is not liquefiable or liquefiable only at substantially higher temperatures than the thermoplastic material (for example higher by at least 80° C.), the connector body extending between a proximal end and a distal end along a proximodistal axis and including a distally facing punching edge.

The connector may be a connector for being used in embodiments described herein, and the properties of connectors described in this text referring to various different embodiments of the invention, including embodiments without a deformable body portion, are optional features of the connector also, including locking and flow directing features, circular or non-circular shapes, etc.

In all categories and groups of embodiments of the method and/or the connector according to the invention, the connector and/or (if applicable) the body (core, sheath or the like) of the connector and/or the openings can be rotationally symmetric about the axis—in the case of a body in the form of a sheath with the exception of the exit openings. Alternatively, the connector and/or the body (if applicable) and/or the openings or one of the openings can have a shape deviating from rotational symmetry. By this, in addition to securing against shear movements and against axial relative movements, the connection may also secure against rotational relative movements.

In all categories and groups of embodiments, the method may be carried out by an apparatus for an automated bonding. Especially, the source of the mechanical vibrations may be provided guided by a robot arm for example.

Also, the apparatus may include means for automatically placing the connector relative to the first object and, if applicable, the second object. For example, a robot arm or other tool that holds the source of the vibrations may be provided with an automatic feed for the connector. For example, the feed may include a magazine for connectors and a separating and feeder unit for feeding the connectors one after the other to the arranging place.

Accordingly, the invention also concerns an apparatus having the means and being configured to carry out the method as defined in the claims in an automated manner.

Next, principles of the process of making the flow portion flowable and useful material properties are discussed.

Generally, in the step of causing the flow portion to be made flowable, liquefaction can be caused to an extent that the liquefied material loses any memory of the shape it had before liquefaction, i.e. to an extent that goes beyond a mere plasticization.

Mechanical vibration or oscillation suitable for methods and devices according to aspects of the invention has preferably a frequency between 2 and 200 kHz (even more preferably between 10 and 100 kHz, for liquefaction at the distal end or as far as the distal end between 15-30 kHz, for liquefaction at the proximal end (head forming) only between 15-70 kHz) and a vibration energy of 0.2 to 20 W per square millimeter of active surface. Such vibrations are e.g. produced by ultrasonic devices as e.g. known from ultrasonic welding. The vibrating element (tool, for example sonotrode) is e.g. designed such that its contact face oscillates predominantly in the direction of the element axis (longitudinal vibration) and with an amplitude of between 1 and 100 μm, preferably around 10 to 30 μm. The oscillation may at least partially be longitudinal oscillation, however, also transversal modes may be present. Also, rotational or radial oscillation may be possible also.

The fact that the thermoplastic material is liquefied by mechanical vibration brings about the advantage that the process is potentially very fast. Tests have revealed that under the above-described conditions as short time as about 1 s or even as short as 0.5 s may be sufficient.

The onset of liquefaction may further be controlled by geometrical structures in the form of energy directors as known from ultrasonic welding. Energy directors (or energy concentrating structures) may have the shape of ribs or humps or similar, either of the thermoplastic material or of the surface that comes into contact with the thermoplastic material. Generally, energy directors will be shaped to yield a comparably small interface area at the interface at which liquefaction is to set in to concentrate the vibration energy to this small area so that there will be a higher energy absorption per unit area that will cause a stronger heating. As soon as the temperature at these places is above the glass transition temperature, there will be enhanced internal friction, and this will further promote the energy absorption and liquefaction.

In this text, the expression "thermoplastic material being capable of being made flowable e.g. by mechanical vibration" or in short "liquefiable thermoplastic material" or "liquefiable material" or "thermoplastic" is used for describing a material including at least one thermoplastic component, which material becomes liquid (flowable) when heated, in particular when heated through friction, i.e., when arranged at one of a pair of surfaces (contact faces) being in contact with each other and vibrationally or rotationally moved relative to each other, wherein the frequency of the vibration has the properties discussed hereinbefore.

Thermoplastic material suitable for the method and device according to the invention are solid when provided for the method (working temperature). The material may include a polymer with chain molecules (especially C, P, S or Si based) and it transforms from solid into liquid or flowable above a critical temperature range, for example by melting, and re-transforms into a solid material when again cooled below the critical temperature range, for example by crystallization, whereby the viscosity of the solid phase is several orders of magnitude (at least three orders of magnitude) higher than of the liquid phase. The thermoplastic polymer is not cross-linked covalently or cross-linked in a manner that the cross-linking bonds open reversibly upon heating to or above a melting temperature range. The polymer may further include a filler (in addition to the susceptor additive), e.g. fibers or particles of material that has no thermoplastic properties or has thermoplastic properties including a melting temperature range that is considerably higher than the melting temperature range of the basic polymer.

For the thermoplastic material of the connector, in embodiments especially at least one of the following three conditions may be met:

The glass transition temperature is above room temperature so that at room temperature the thermoplastic material is below the glass transition temperature. More in general, the glass transition temperature may be chosen to be above a temperature of intended usage.
The thermoplastic material is highly crystalline.
The thermoplastic material is itself fiber reinforced Any combination of these is possible.

Thermoplastic materials are well-known in the automotive and aviation industry. For the purpose of the method according to the present invention, especially thermoplastic materials known for applications in these industries may be used.

Examples for the thermoplastic polymer for the thermoplastic material to be used in the method according to the invention are polymers, polymer mixtures, co-polymers or filled polymers, wherein the basic polymer or co-polymer is e.g. polyethylene, polypropylene, polyamides (in particular Polyamide 12, Polyamide 11, Polyamide 6, or Polyamide 66), Polyoxymethylene, polycarbonate-urethane, polycarbonates or polyester carbonates, acrylonitrile butadiene styrene (ABS), Acrylester-Styrol-Acrylonitril (ASA), Styrene-acrylonitrile, Polyvinyl chloride, Polystyrene, or Polyetherketone (PEEK), Polyetherimide (PEI), Polysulfon (PSU), Poly(p-phenylene sulfide) (PPS), Liquid crystal polymers (LCP) etc. Polymethylmethacrylate (PMMA), or copolymers or mixtures of these.

If a specific device design requires that the thermoplastic polymer in its solid state needs to be able to transfer ultrasonic vibration energy, preferably with a minimum of energy loss, from an input location of the device to an absorption location in the device, for example if the connector body does not reach to the proximal end, and/or if other demands require a minimum stiffness, the thermoplastic material may need an elasticity coefficient (at ambient temperature) of at least 0.5.GPa or preferably of at least 1.0 GPa.

In addition to the thermoplastic polymer, the thermoplastic material may also include a suitable filler, for example reinforcing fibers, such as glass and/or carbon fibers. The fibers may be short fibers. Long fibers or continuous fibers may be used especially for the non-flowing portion.

The fiber material (if any) may be any material known for fiber reinforcement, especially carbon, glass, Kevlar, ceramic, e.g. mullite, silicon carbide or silicon nitride, high-strength polyethylene (Dyneema), etc.

Other fillers, not having the shapes of fibers, are also possible, for example powder particles.

In this text, generally a "non-liquefiable" material or a "not liquefiable material" is a material that does not liquefy at temperatures reached during the process, thus especially at temperatures at which the thermoplastic material of the connector is liquefied. This does not exclude the possibility that the non-liquefiable material would be capable of liquefying at temperatures that are not reached during the process, generally far (for example by at least 80° C.) above a liquefaction temperature of the thermoplastic material or thermoplastic materials liquefied during the process. The liquefaction temperature is the melting temperature for crystalline polymers. For amorphous thermoplastics the liquefaction temperature (also called "melting temperature" in this text) is a temperature above the glass transition temperature at which the becomes sufficiently flowable, sometimes referred to as the 'flow temperature' (sometimes defined as the lowest temperature at which extrusion is possible), for example the temperature at which the viscosity drops to below $10^4$ Pa*s (in embodiments, especially with polymers substantially without fiber reinforcement, to below $10^3$ Pa*s)), of the thermoplastic material.

For example, the non-liquefiable material may be a metal, such as aluminum or steel, or wood, or a hard plastic, for example a reinforced or not reinforced thermosetting polymer or a reinforced or not reinforced thermoplastic with a melting temperature (and/or glass transition temperature)

considerably higher than the melting temperature/glass transition temperature of the liquefiable part, for example with a melting temperature and/or glass transition temperature higher by at least 50° C. or 80° C. or 100° C.

In this text, the terms "proximal" and "distal" are used to refer to directions and locations, namely "proximal" is the side of the connection from which an operator or machine applies the mechanical vibrations, whereas distal is the opposite side. The broadening of the connector on the proximal side in this text is called "head portion", whereas the broadening at the distal side is the "foot portion". For connectors with or without a pre-formed head portion that are inserted into the aligned openings from the proximal side, the distal end will be the end sometimes in literature referred to as the "tail end".

BRIEF DESCRIPTION OF THE DRAWINGS

In the following, ways to carry out the invention and embodiments are described referring to drawings. The drawings are schematic in nature. In the drawings, same reference numerals refer to same or analogous elements. The drawings show:

FIG. 1a an arrangement for carrying out the connecting process according to the invention;

FIG. 1b the arrangement of FIG. 1a after the process;

FIG. 2 a variant with first and second objects separated by an additional layer;

FIGS. 3-4 alternative cross sections of punching sleeve portions of connector bodies;

FIGS. 15-17, 18a, 18b, 19a, 19b, 20, 21, 22a, 22b, 23a, 23b, 24a, 24b, and 25-27 further alternative embodiments; and FIG. 28 a process diagram.

FIGS. 1a-2, 5-27 are all schematical vertical sections (sections through a plane parallel to the axial direction), FIGS. 3 and 4 are horizontal sections (sections through a plane perpendicular to the axial (proximodistal) direction).

DETAILED DESCRIPTION OF THE INVENTION

Figure 5:
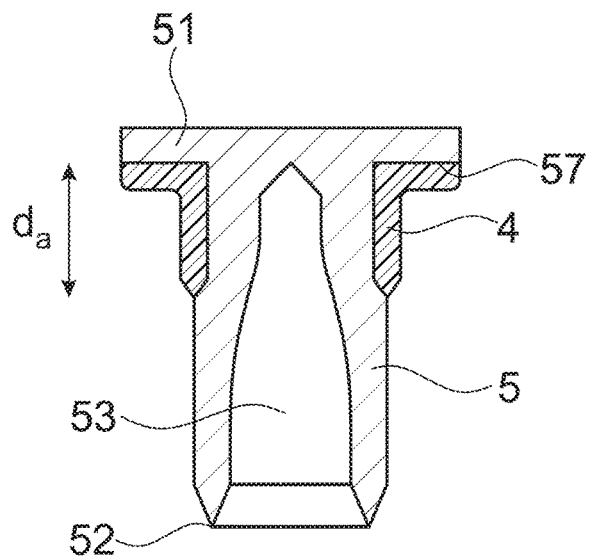
FIGS. 5-13 alternative embodiments.

FIG. 1a depicts a basic set-up of embodiments of the invention. The first object 1 is a board or sheet, for example of a fiber composite material (fiber reinforced polymer material) such as a Carbon fiber-reinforced polymer (CFRP) or a Fiberglass. It has an essentially flat sheet portion with two, for example, essentially parallel broad surfaces. The broad surface that in the figures is the upper surface is herein termed "proximal" surface and the opposing surface is the "distal" surface.

The second object 2 is made of a metal. It also has a sheet portion with the proximal broad surface of the sheet portion lying against the distal broad surface of the first object's sheet portion.

In a variant shown in FIG. 2, between the first and second objects a further layer, such as an adhesive and/or separating insulating layer 8, may be present. Such additional layer may, for example, be formed of a thermoplastic material, or it may be formed of a resin, for example a not cured (still flowable) or not fully cured resin. If such an adhesive layer is formed of a polymer, it may be of a same or a different polymer as the matrix material of the first and/or the second object (if any).

If the thermoplastic material of the layer 8 and thermoplastic material of the connector are compatible, the method may include causing the thermoplastic material of the connector to be welded to the separating layer 8. Such a weld may have an additional insulation effect.

FIG. 1a also depicts the connector 3. The connector 3 has a connector body 5, for example of a hard steel, and a thermoplastic material portion 4. The connector body essentially has the shape of a punching sleeve with a proximal head 51. The connector body forms a distally facing distal punching edge 52. Because the connector body at the distal end is sleeve-like, this punching edge 52 is the distal end of a blade-like structure that in the depicted embodiment goes around a full periphery of the connector body.

A depth (axial extension) of the thermoplastic material portion 4 corresponds to at least a thickness of the first object.

The hollow space 53 formed in an interior of the connector body 5 may be open towards the distal side only (as depicted), or it may possibly go through the connector body and have a mouth open to the proximal side also.

In the depicted configuration, the thermoplastic material portion 4 forms a thermoplastic sleeve or collar around a proximal part of the connector body 5.

The connector in the embodiment of FIGS. 1a and 1b is assumed to be rotationally symmetric about the proximo-distal axis 20. This, however, is not a requirement:

Firstly, the connector can have other shapes, for example elliptical, (see FIG. 3 showing a schematical cross section, perpendicular to the proximodistal axis, through a connector body of an alternative embodiment). The possibility of providing connectors with a not rotationally symmetrical overall shape exists for all embodiments, since the approaches described herein do not require any rotational movement for insertion.

Secondly, the connector body may have structures cooperating with the thermoplastic material to steer the flow of the thermoplastic material, to form reservoirs, for mechanical locking, etc., as described in more detail hereinafter.

Thirdly, the connector may have a functional structure deviating from rotationally symmetrical, such as a fastening structure for a further object, a not rotationally symmetrical head, etc.

All of these options are independent of each other and can be realized alone or in combinations.

Also the following teaching referring to an optional pre-made opening or pre-made openings is meant to generally refer to embodiments of the invention, not only the embodiment of FIGS. 1a/1b or to embodiments shown in the drawings.

The first and second objects may be provided without any pre-made opening (pre-drill or similar). Alternatively, the first and second objects may have a pre-made opening 11, as schematically illustrated in FIG. 2 by the dashed lines. Such a pre-made opening may be a pre-drill. It may, for example, serve for guiding during the subsequent process (such as together with a correspondingly shaped portion of the tool or of the connector), and/or it may reduce the forces to be applied during the process. It is also possible to provide the second object with a larger diameter pre-made opening 21, the diameter for example being sufficient for the distal portion of the connector body to reach through so that no additional force is required for driving the connector into the second body.

In embodiments having such an opening in the second object, the excess material that is displaced to distally by the connector can, together with the flow portion of the thermoplastic material, be used to close off the opening in the second object 2 and thereby to compensate tolerances and/or form a distal connector foot that closes off the assembly for example flush with the distal surface, especially if the opening is not cylindrical but is countersunk and a flat counter element is used. In a group of such embodiments, this is done for a first object having a thermoplastic matrix in which the part of the flow portion that stems from thermoplastic material of the connector (if any) is fused with matrix material, or if the flow portion consists of matrix material.

FIG. 1*b* shows the arrangement during the process. The sonotrode 6 has a distal end face adapted to the shape or desired shape of the connector's proximal end face, more particularly to the proximal end face of the head 51. The proximal end face serves as a coupling-in face for the mechanical vibration. In embodiments (not shown in the Figures), it may have a guiding protrusion (pin) 61 corresponding to a guiding opening of the connector to define the relative lateral positions. During the process, the sonotrode presses the connector 3 into the first object and then the second object while mechanical vibrations are coupled into it—and from the sonotrode into the connector. The figure also very schematically illustrates a non-vibrating support 7. In addition to such a support, an optional hold-down element 9 may prevent large-scale deformations caused by the substantial forces acting on the objects.

In the depicted embodiment, a counter element for the distal foot forming process, namely a riveting die 70 is shown separate from the non-vibrating support 7 so that there exist the option of first applying the force and vibrations that punch the connector into the objects without the presence of the riveting die (in fact, in embodiments in which the distal foot portion of the connector is not necessary, a riveting die can be omitted entirely). However, in other embodiments there need not be a non-vibrating support in addition to the riveting die.

A shape of the riveting die may be chosen so that a foot portion, as illustrated in FIG. 1*b* is formed by outwardly deforming a distal end of the connector body. Riveting dies for this are known from the prior art.

The mechanical vibration energy will firstly have the effect of making a cleaner, better defined punching process possible compared to prior art punch rivets. Secondly, absorbed vibration energy will cause the thermoplastic material portion 4 to be heated and made flowable at least in part. This may be caused by one or a combination of the following:

- The material of the connector and/or of the first/second object is heated by the vibration assisted punching process, and this will cause indirect heating also of the thermoplastic material that is in contact with these elements.
- Local friction between the thermoplastic material (that, by being coupled to the connector body, is also subject to the vibrations) and the first object causes a local heating of the thermoplastic material where in contact with the first object.

The flowable thermoplastic material may undergo one or a combination of the following:

- The material will flow in to structures of the first object (such as imperfections of the punched opening, material-inherent pores, other hollow structures, inhomogeneities (for example spaces between fiber ends projecting into the gap, spaces between material chips, etc.)), and after later re-solidification mechanically lock the connector to the first object, especially by a positive-fit connection. This kind of interlocking is schematically illustrated in FIG. 1*b*.
- If the first object is of a material with a thermoplastic matrix, and if the matrix material is the same as the thermoplastic material of the connector or if it is capable to form a common melt, the material may be welded to the first object material.

Depending on the material composition, the resistance encountered by the thermoplastic material during insertion is, if the thermoplastic material is just a sleeve surrounding the connector body 5 in the way illustrated in FIG. 1*a*, rather high and may not be sufficient for ensuring that any direct contact between material of the first object 1 and the connector body 5 is prevented. Depending on the application, this may be tolerated, for example if the first object is of fiberglass, and a direct contact between the connector body's metal and the fibers is not detrimental. For certain applications, however, it may be beneficial if in the region of the first object the connector body is fully shielded by the thermoplastic material, or at least if in any axial depth there is thermoplastic material.

A first measure to achieve this is very schematically illustrated in FIG. 4 showing a cross section (along a plane perpendicular to the proximodistal axis) through a connector body's punching sleeve portion. The connector body includes axially running channels 56 that are within a lumen of the opening punched out by the punching edge and along which thermoplastic material when under hydrostatic pressure (such hydrostatic pressure will arise at the latest when the head portion is pressed against the proximal face surrounding the mouth of the opening punched out) will flow. Such channels will ensure an axial distribution of the thermoplastic material along a full depth of the channels. Depending on parameters like material resistance, material properties (such as properties of a matrix and the filling grade of the first object material) and the amount of the thermoplastic material, this may also cause a full shielding of the connector from the first object material (or at least of its fiber reinforcement if applicable).

An alternative measure is shown in FIG. 5. The connector body includes a proximal slightly indented portion (indentation 57) that may for example, in contrast to the channels, run around a full periphery of the connector body or at least around a substantial part thereof. Because the surface of the connector body at the depth of the indented portion is offset towards radially-inward compared to the punched-out portion (and for example compared to the punching edge 52), thermoplastic material will remain in the indentation and thereby shield the connector body from the first object material. The axial depth $d_a$ of the indented portion and of the thermoplastic material may be adapted to the thickness of the first object. For example the axial depth may at least correspond to the thickness of the first object material. (the same optional condition may hold for the channels described hereinbefore or the other indentations illustrated hereinafter).

Figure 6:
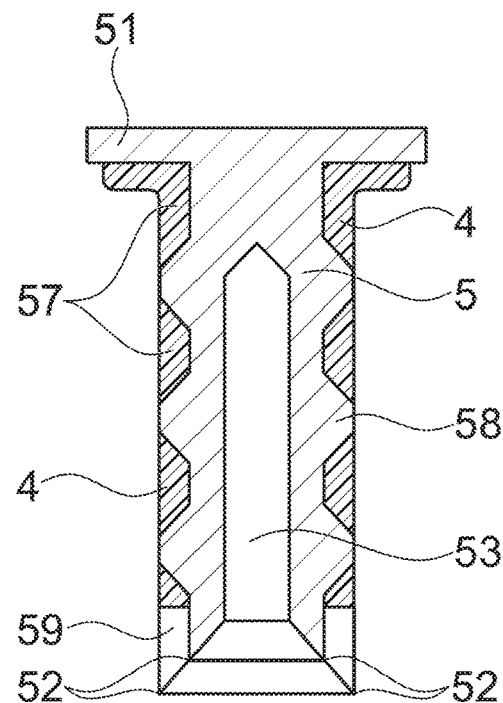

An even further alternative is illustrated in FIG. 6. The connector body includes multiple indentations 57 that are filled by the thermoplastic material 4.

In this, the thermoplastic material 4 may optionally radially protrude further than a radial extension of the connector body's immersed portion (the immersed portion being the part that goes into or through the first object, here being the connector except for the head portion 51). In the depicted configuration, the radial extension of the immersed portion corresponds to the radial extension of protruding portions 58 between the indentations 57. Alternatively, as illustrated, the radial extension of the thermoplastic material may be not further than the radial extension of the connector body's immersed portion. Especially, the radial extension of the thermoplastic material may correspond to the radial extension of the punching edge 52 so that no thermoplastic material can be sheared off during a movement of the connector through the first object/second object.

The hereinbefore discussed effect of frictional forces generating a local heating leading to (or contributing to) a liquefaction of the thermoplastic material may nevertheless be present due to a residual resilience of the first object (and/or second object) material. For example, it has been observed that when a carbon fiber composite is punched, carbon fibers around the punching hole tend to stick outward, and this may lead, together with the vibrations of the thermoplastic material in contact with these fibers sticking outward, to a local heating. Other forms of resilience are possible.

In addition or as an alternative, like in other embodiments of the invention, in addition or as an alternative to friction between the first object material/second object material and the thermoplastic material of the connector, it is also possible to use the heat that is generated by the vibration assisted punching step to make the flow portion flowable. This heat may, for example, be stored in and/or conducted by the connector body. This approach of using the heat generated by the punching for liquefying may especially, but no only, be applied if the first object and/or the second object includes a thermoplastic matrix.

A further detail of FIG. 6—that may be implemented independently of the indentations, i.e. also for other embodiments—concerns the punching edge 52. In contrast to the previous embodiments, the punching edge does not consist of a distal-most edge of the connector running around a full periphery. Rather, the punching edge has sections that are axially offset from the distal end, for example due to axial recesses 59 along the periphery.

In accordance with an even further alternative (that again pertains to all possible embodiments, including different arrangements of the thermoplastic material portion), the connector body may have axial slits running proximally from the distal end or other structures that make an outward bending of the distal end of the connector body easier. Such features may, for example, be beneficial in case the distal end of the connector body is shaped into a rivet foot.

Figure 7:
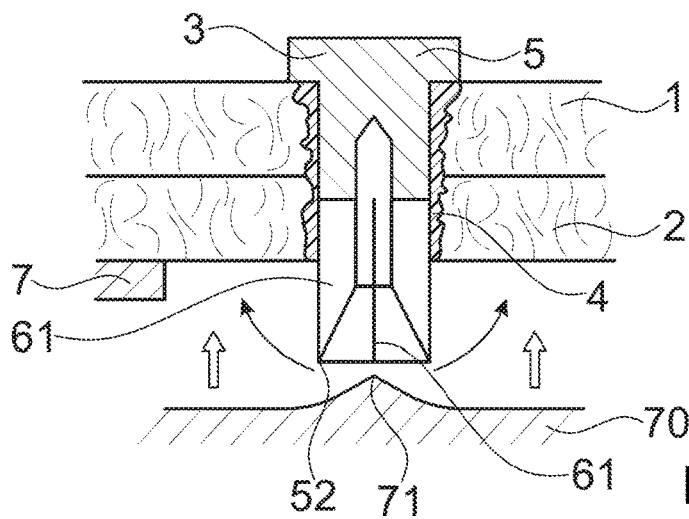

A connector 3 having such slits 61 is shown in FIG. 7. During the step of pressing the connector into the first and/or second objects, with mechanical vibration acting on it, and/or thereafter, the distal end of the connector 3 and a counter element 7 (optionally with a shaping feature 71) may be pressed against each other to deform the distal end of the connector body for causing a foot portion. For example, the portions between the slits may be folded outwardly so that the connector is anchored in a rivet-like manner. The deformation of the distal portion to form a foot portion may be vibration assisted or not. As mentioned and as explained hereinafter in more detail, it is also possible that a connector foot (rivet foot) is formed within the deformed second object.

FIG. 7 shows also an example of an arrangement in which the second object 2 is not metallic but of a composite material, for example of a same composition as the first object, or of a different composition. This is independent of the other features illustrated in FIG. 7. A configuration with a second object being non-metallic and for example of a composite (such as a carbon fiber composite or glass fiber composite) can be used in any embodiment described in this text that has a second object and in which there is not an explicit requirement for this second object being metallic.

Figure 8:
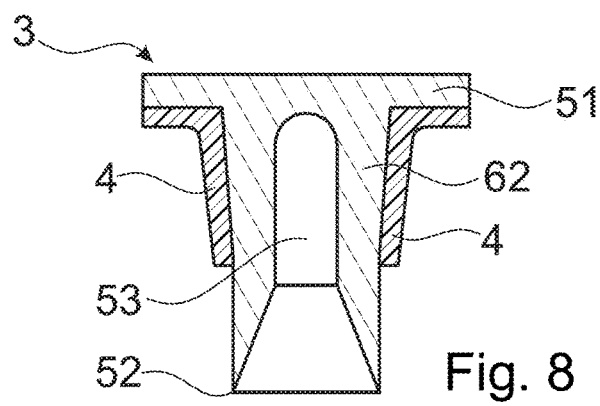

A further example of a connector is shown in FIG. 8. Compared to the connector of FIG. 1a, the connector body has an outward tapering portion 62 (slightly conical portion). The outward tapering portion corresponds, at least in part, to the portion around which the thermoplastic material portion 4 forms a collar. Due to the slight taper, the thermoplastic material is pressed into the material of the first object especially towards the end of the insertion step. This may both lead to an improved anchoring in the first object material and an improved, homogenous shielding by a more even force distribution not only concentrated at the distal-most section of the thermoplastic material portion 4.

Figure 9:
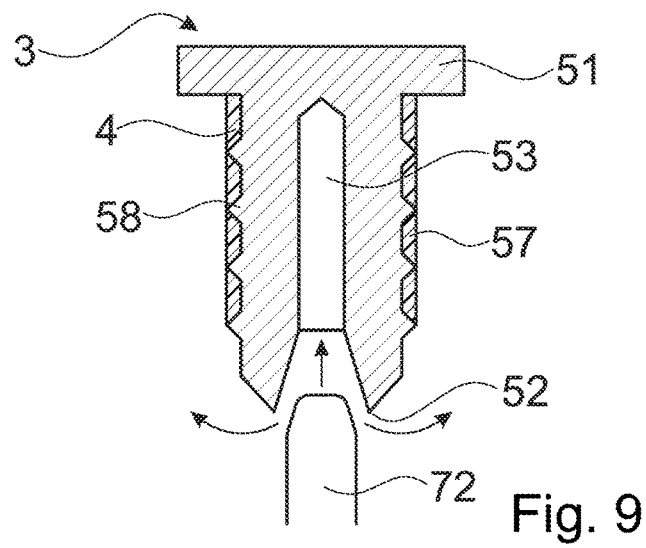

A further possibility is schematically sketched in FIG. 9. A spreading counter element 72 is used to spread the immersed portion of the connector body outward, for example after the punching step, or after a part of the punching step. Due to this, additional friction at the lateral surfaces of the immersed portion of the connector is generated, and this may lead to an additional heating effect (together with the vibrations) and ultimately to making the thermoplastic material flowable. This may be used in configurations with indentations 57 filled by the thermoplastic material, as illustrated, or also in other configurations, for example with the thermoplastic material forming a collar (as shown in embodiments of FIGS. 1a, 5, 8) or other arrangements.

The approach of causing the connector body to slightly spread while the mechanical vibrations act may be advantageously be combined with the axial slits described hereinbefore or other feature making the connector body flexible with respect to radial deformations.

Figure 10:
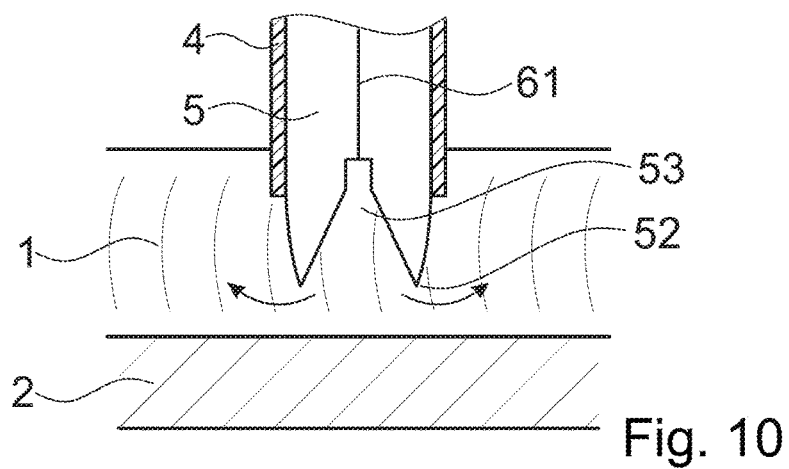

A variant of this further possibility is illustrated in FIG. 10. In contrast to the embodiment of FIG. 9, no separate spreading counter element is needed. Rather, the connector body comprises, like the previously discussed embodiments, a hollow space 53, but in contrast to these embodiments the hollow space is comparably small, with an axial extension, for example, being smaller than a thickness of the first object 1. Due to this, the hollow space 53 is quickly filled with material of the first object, resulting in a material jam in the hollow space and consequently an enhanced outward pressure.

The depicted embodiment has axial slits 61 that extend further axially than the hollow space so that it is the material of the first object itself that spreads the distal portion of the connector body outward on its way through the material of the first object.

In the depicted embodiment, a further optional feature is illustrated. The initial radial position of the punching edge 52 is a bit offset to the interior so that when the distal end of the connector is deformed outwardly, this outward movement of the punching edge may compensate the offset. This feature—that is optional for embodiments that include spreading—may be beneficial in case the mechanical resistance encountered by the connector due to the material of the first object is small compared to the mechanical resistance encountered when punching through the second object. The compensation may ensure that the punching edge is in the ideal position (outermost, with the immersed portion extending straight in the axial direction) when the connector punches through the second object material.

In embodiments in which the second object material exhibits a much stronger mechanical resistance to the punching compared to the first object, the situation may arise that it is not possible for the part that has the punching edge 52 to vibrate while the connector body punches the second object.

In these situations, the method may include stopping the energy flow of mechanical vibration energy when the connector's distal end reaches the second object. For example, the operator or apparatus carrying out may turn off the vibration source connected to the tool (sonotrode) when a pre-determined condition (depth reached, enhanced resistance measured, more power absorbed, etc.) is met. This may optionally include exchanging the tool for the second step, i.e. the sonotrode may optionally be removed and another tool may be used for pressing the connector further into the second. Alternatively, the connector may just be further pressed into the second object, with the second object causing a much larger damping.

In situations, where the mechanical vibrations are suppressed to a substantial extent when the punching edge reaches the second object, nevertheless, it should be ensured that the thermoplastic material of the connector can become flowable. This can, for example, be achieved by one or a combination of the following:

The heat generated while punching the first object when the connector is under vibration (possibly with the further heat generated by punching the second object) is sufficient for making the thermoplastic material flowable. For example, the connector or the first object or both may conserve and conduct the heat sufficiently for liquefying the thermoplastic material that is in contact with both, the connector and the first object. Also heat conservation and/or conduction by the second object may contribute.

The method is carried out in a multi-step process, with the liquefaction of the thermoplastic material taking place (also) at an other stage than the penetration of the second object by the connector body.

A connector including a plurality of parts may be used, in which the distally facing punching edge 52 is, at least for some time, de-coupled from the thermoplastic material portion 4.

Figure 11:
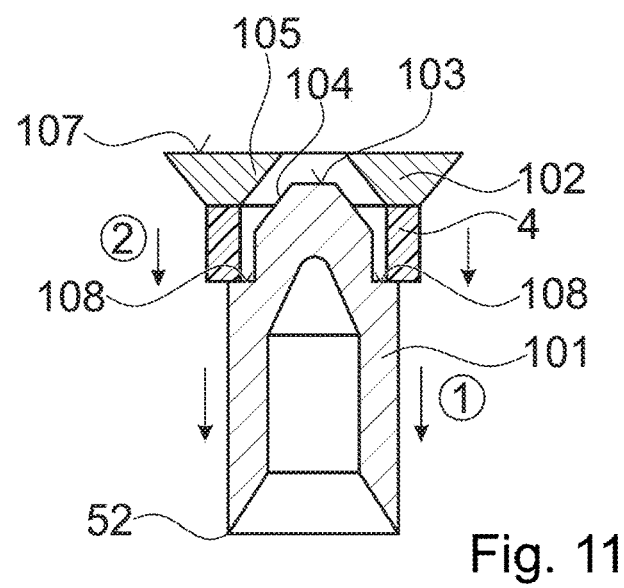

FIG. 11 depicts an example of a connector that includes two parts. A first connector body portion 101 forms a first connector part. The first connector body part 101 is shaped essentially as punching sleeve with a proximally facing coupling-in face 103 for the mechanical vibrations and a punching force. A second connector body portion 102 carrying the thermoplastic material portion 4—in the depicted embodiment as a collar distally of it—together with the thermoplastic material portion 4 forms a second connector part. The second connector body portion has a second proximally facing coupling-in face 107. The first connector body portion has an outer tapered surface section 104, and the second connector body portion has a correspondingly matching inner tapered surface section 105.

For the process, in a first step the first connector body portion 101 is punched through the assembly of the first and second objects using a first, central sonotrode. Thereafter, a second, outer sonotrode is used to press the second connector body portion 102 against the assembly of the objects and the first connector body portion 101 while mechanical vibration energy is coupled into it. Thereby, the thermoplastic material 4 is pressed against a shoulder 108—being an example of an abutment feature of the hereinbefore discussed kind—of the first connector body portion and liquefied in contact with it and pressed outwardly. The matching tapered surface sections 105, 104 at the end of the process are pressed against each other, resulting in an appropriate press fit or material connection (depending on the chosen parameters).

Figure 12:
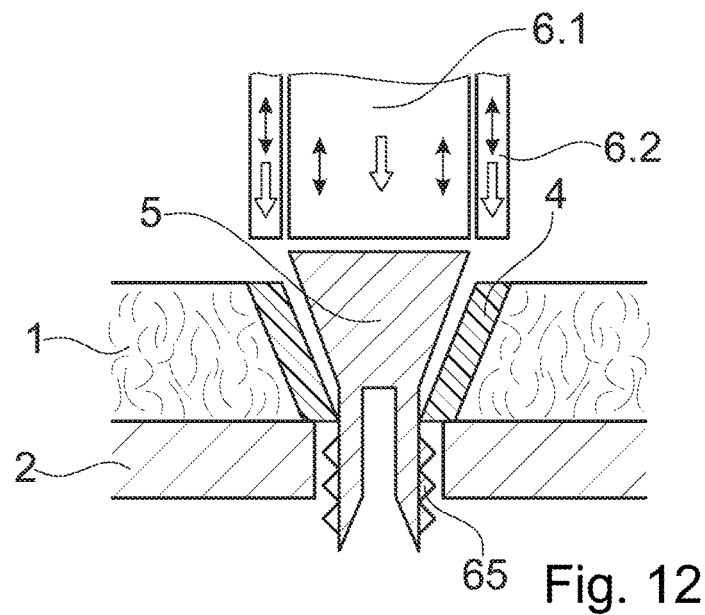

A variant of the embodiment of FIG. 11 with an outer sonotrode 6.2 acting directly on the thermoplastic material portion 4 is depicted in FIG. 12. Instead of including a second connector body portion as the embodiment of FIG. 11, the embodiment of FIG. 12 does not include such a second connector body portion but the second connector part is constituted by a separate thermoplastic anchoring element. The anchoring element has a proximally facing coupling-in face for a sonotrode (the outer sonotrode 6.2).

For the embodiment of FIG. 12 there is the option of placing the thermoplastic material portion relative to the first object separately from the connector body, for example prior thereof and prior to the punching step if the opening in the first object material is pre-drilled. In the depicted embodiment, the first object material includes a conical pre-drill. The second object material is not pre-drilled but punched through by the connector. As in embodiments with pre-made openings, the excess material of the first object that is displaced to distally by the connector and/or the flow portion can be used to close off the opening in the second object 2 and thereby compensate tolerances serve as electrical insulator and/or form a distal connector foot.

The embodiment of FIG. 12 includes a further feature that is independent of the other features of this embodiment and can be implemented for any one of the other embodiments of the present invention, too. Namely, the connector includes a plurality of barb features 65 that anchor the connector in the second object. Such barb features by providing a resistance against a pulling-out of the connector contribute to the anchoring and may optionally even make a subsequent deformation step of the distal end unnecessary.

More in general (pertaining generally to embodiments of the present invention, not only to the one described referring to FIG. 12), the structures and materials of the connector on the one hand and the second and/or first objects on the other hand may be adapted to each other in a manner that there is a resistance against pulling the connector out after it has been punched into the first and (if applicable) second objects. To this end, the outer structure of the connector, especially of the connector body, may be adapted to the resilience of the material or materials of the second and/or first object. This includes the possibility of the connector body being deformed within material of the second object, as mentioned hereinbefore.

Figure 13:
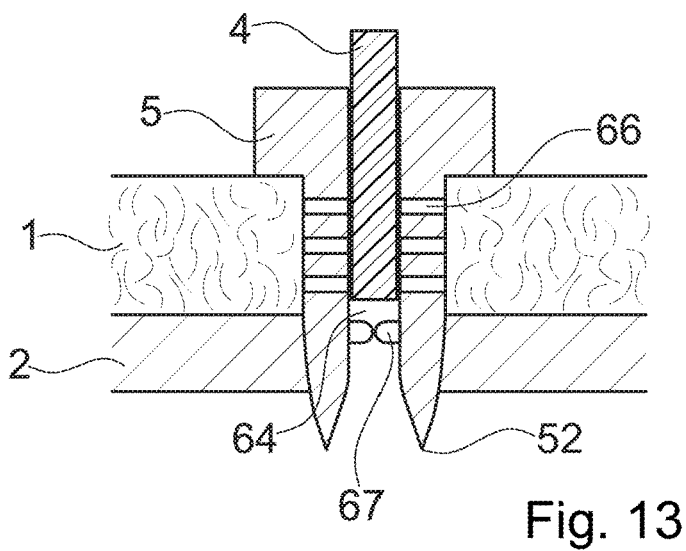

Also in the embodiment of FIG. 13, the connector includes a plurality of parts, and the method is carried out in a plurality of steps.

More in concrete, the connector body 5 includes a longitudinal hole 64 accessible from the proximal side and a plurality of lateral openings 66 connecting the longitudinal hole 64 to an outside. After the connector body 5 has been punched through the first and second objects, for example assisted by mechanical vibration, a thermoplastic anchoring element forming the thermoplastic material portion 4 is introduced into the longitudinal opening and pressed against a stop feature 67 (being a further example of an abutment feature of the hereinbefore discussed kind) and made flowable at least in parts, whereby the flowable material is pressed out through the lateral openings and into structures of the first object and/or spaces between the connector body and the first object.

Either of the following alternatives may apply:

During the step of punching, the connector body is subject to mechanical vibration. Thereby, the connector body is heated to a temperature sufficient to make thermoplastic material of the thermoplastic element flowable when the latter is pressed into the longitudinal opening, even if during this step no additional vibration energy is coupled into the thermoplastic element.

During the step of punching, the connector body is subject to mechanical vibration and is thereby heated. During the step of pressing the thermoplastic material into the opening, also the thermoplastic element is subject to mechanical vibration to cause additional energy to be absorbed especially at a contact interface between the thermoplastic element and the stop feature(s), to make the thermoplastic material flowable. For this, optionally a different sonotrode than the sonotrode used for the punching step may be used.

The step of punching is carried out conventionally, without additional energy impact. During the step of pressing the thermoplastic material into the opening, the thermoplastic element is subject to mechanical vibration to cause energy to be absorbed especially at a contact interface between the thermoplastic element and the stop feature(s), to make the thermoplastic material flowable.

In either of the alternatives, it is not excluded that additional energy from a different energy source is coupled into the thermoplastic element, for example radiation energy, heat caused by resistive heating, etc.

Figure 14A:
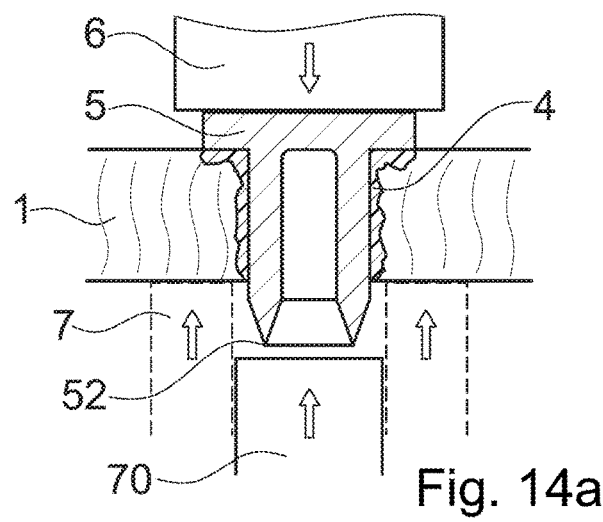
FIGS. 14a and 14b a possibility for step of forming a distal foot.
Figure 14B:
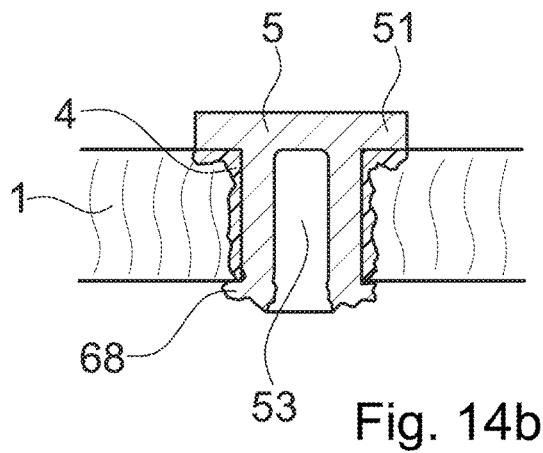

FIGS. 14a and 14b illustrate the process that includes deformation of the distal portion of the connector body 5 in a step that follows the steps of driving the connector into the assembly of the first and second objects or into the first object and coupling mechanical vibration into the connector until thermoplastic material becomes flowable. This deformation step may for example be carried out while the flowable portion of the thermoplastic material is still flowable and/or after it has re-solidified.

For deformation of the distal end, the connector is compressed between a tool 6 (for example the sonotrode; also an other tool could be used) and a counter element 70. The counter element may be constituted by a non-vibrating support or may be an other, dedicated tool. In addition to the counter element, optionally a non-vibrating support 7 can be used to stabilize the assembly by directly abutting against the underside of the assembly that includes the first and, if applicable, second objects.

The deformation will result in a deformed section 68 forming a foot portion for the connector that then serves as a kind of rivet. The deformed section may be flange-like as illustrated in FIG. 14b or include several bent-out sections if the connector body is appropriately slitted, for example as described hereinbefore.

The deformation of the distal end of the connector body may optionally be carried out vibration assisted or heat assisted, for example by coupling corresponding energy into the tool or the counter element.

While FIGS. 14a and 14b illustrate a two-step process, a deformation of the distal end of the connector can also be carried out directly in the step of punching. To this end, a support against which the assembly lies during punching may have an appropriate shaping indentation at the place where the connector is punched through.

The embodiment shown in FIGS. 14a and 14b is also an example of an arrangement in which the connector is connected to a single object (the first object 1) only.

Configurations that include a separate deformation step for the connector body may also apply for arrangements of the kind described hereinbefore with a first and second object.

The other configurations described in this text using examples with a first and second objects may also be implemented with a single object, (with the exception, of course, of embodiments that are impossible to realize with a single object only.)

Figure 15:
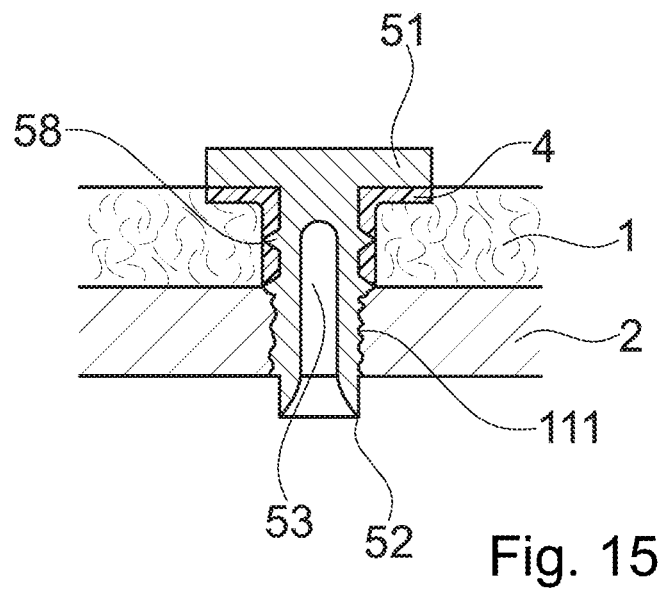

For the embodiment of FIG. 15, the connector may have any configuration described in this text. In FIG. 15, a connector similar to the one of FIG. 6 but with the thermoplastic material restricted to a more proximal region is illustrated. FIG. 15 illustrates the option that due to the forces and energy input that apply during the punching step, an additional material connection may be caused between the connector body and material for example of the second object. For example, if the connector body and the second object are both metallic, a weld 111 may be caused. Such a weld may be a cold weld for example, or may be caused by fusion in a small region around the connector body, which fusion may be caused by the joint action of the energy input and mechanical pressure. It is also possible to support the welding process by additional means, such as by causing an electrical current to flow between the connector body and the second object, for example a large current that flows for a short time only.

Figure 16:
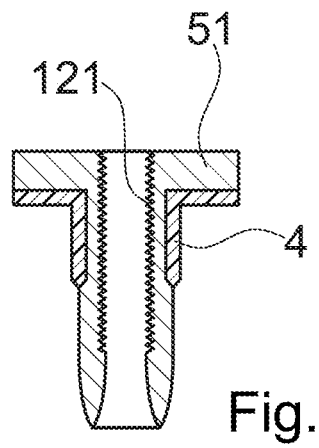

FIG. 16 yet very schematically illustrates, for a connector of the kind shown in FIG. 1a, the possibility of providing the connector with means for attaching a further element thereto. In FIG. 16, an inner thread 121 in the connector body is illustrated.

Figure 17:
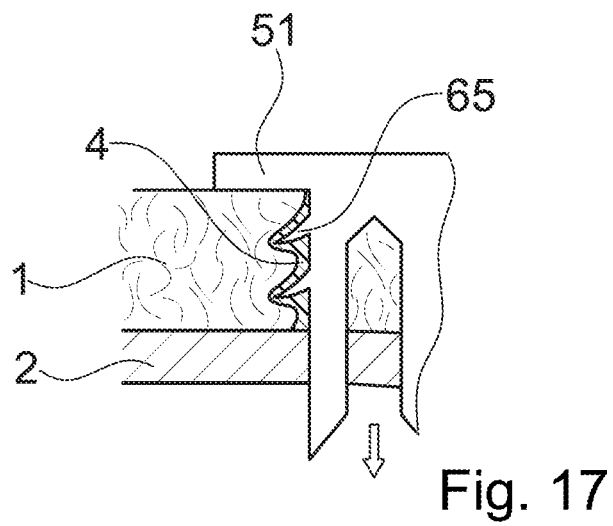

In the variant shown in FIG. 17, the thermoplastic material that is caused to flow is not thermoplastic material of the connector but of the first object. Especially, the first object may be of a fiber composite with a thermoplastic matrix, with the fiber content being at most about 40%. The connector body 5 includes protruding structures 65 that penetrate into the material of the first object 1 and, due to the fact that they are subject to the mechanical vibrations, cause friction that heats the thermoplastic material and makes a portion 4 thereof flowable to anchor, after re-solidification, the connector in the first object material and also to shield, in part, the connector body from the fibers.

The example of FIGS. 18a and 18b shows the principle of an embodiment of a configuration in which the connector body for making the flow portion flowable also serves as a sonotrode.

In a first step, the connector body 5, optionally assisted by mechanical vibration (sonotrode 6) punches through the first object and possibly the second object. Then (FIG. 18b), a vibration source is coupled to the connector body 5 while the connector body is subject to a tensile force. In the depicted configuration, to this end the connector body includes an inner thread, and the vibration source includes a pin 140 with an outer thread capable of being coupled to the inner thread of the connector body. The thermoplastic material portion 4 of the connector is clamped between a proximally facing shoulder of the connector body and a counter element 150 for liquefaction. The arrows within the first object 1 show a possible flow direction of thermoplastic material liquefied at the interface with the connector body.

Subsequently to the re-solidification of the flow portion the vibration source may be de-coupled from the connector body. Optionally, thereafter a head portion may be added, for example by being screwed onto the connector body, and/or a foot portion may be formed. It is also possible to form a foot portion prior to the step of coupling the vibration and the tensile force into the connector body, for example by pressing, towards the end of the step of punching, the distal end of the connector body against a counter element.

The embodiment of FIGS. 18a and 18b is also an example of an embodiment in which the connector body forms a distal punching edge portion and proximally thereof a narrowing. Herein, the narrowing extends to the proximal end, whereby the thermoplastic material portion is accessible from the proximal side. In the embodiment of FIG. 18a/18b this is used for access by the counter element, and in other embodiments, in which the connector body does not necessarily serve as sonotrode, this could be used for access by the sonotrode.

FIGS. 19a and 19b show yet another embodiment that has two special features that are shown in combination in FIGS. 19a and 19b but that can be realized independently of each other and in combination with the other embodiments discussed in this text, too. The depicted embodiment has the thermoplastic material 4 as a sleeve/collar around the connector body; however, the embodiment of FIGS. 19a/19b and the mentioned features can be realized with any other arrangement of the thermoplastic material, including embodiments in which the flow portion only stems from a thermoplastic matrix of the first object.

FIG. 19a shows an assembly of a sonotrode 6, a connector, a first and second object 1, 2, and a counter element 70 in the form of a riveting die. The riveting die has a shaping portion 162 with a dedicated shape, as for example known from prior art punch riveting.

A first special feature of the embodiment of FIGS. 19a/19b is that the connector body 5 has a countersunk head portion 161 and in the process is optionally pushed into the assembly of the first and second objects as far as its proximal end face is flush with the proximal surface of the first object 1 (FIG. 19b). This feature may especially be advantageous if the connector has the sole function of connecting the first and second objects together, as a kind of modified punch rivet.

A second special feature of the embodiment of FIGS. 19a/19b is that the material pairing of the connector body 5 and the second object 2 and the shape of the shaping portion 162 are chosen such that the connector body does not punch through the second object but merely deforms it and forms a distal connector foot within the second object material (FIG. 19b). This may achieved, for example, by choosing a ductile material for the first object, such as a suitable steel or aluminum alloy, providing the shaping portion 162 with a comparably smooth surface, as illustrated in FIG. 19a/19b, and optimizing the material strength of the connector body so that the first object material is punched through but that deformation is possible within the second object 2.

An even further embodiment of a connector is shown in FIG. 20. The connector of FIG. 20 implements a combination of principles explained referring to FIGS. 10 and 13. More in concrete, the thermoplastic material portion 4 is located within the hollow space open to the distal side of the connector body so that this hollow space is at least partially filled and the remaining hollow space 53 (if any) is undersized. The space filled by the thermoplastic material 4 is connected to an outside by lateral exit openings 66, whereby when during the step of moving the connector into material of the first and/or second object due to the too small size of the remaining hollow space 53 a pressure is built up and the thermoplastic material by the generated heat is made flowable, it is pressed out through the lateral openings. In contrast to the embodiment of FIG. 13, therefore, the punching and pressing out can be carried out in a single step using one sonotrode only.

In the embodiments discussed hereinbefore, the connector body 5 extends along a full axial length of the connector and forms a proximal end face thereof. This is not a requirement. FIG. 21 depicts an embodiment in which the connector body 5 is constituted by a tube element that forms the punching edge 52 but that does not reach to the proximal end of the connector. Rather, in this embodiment the thermoplastic material portion 4 forms the proximally facing coupling-in face for the pressing force and the mechanical vibration and in the depicted embodiment also forms a head portion 51.

FIGS. 22a and 22b illustrate further optional features. In the embodiment shown in these figures, the connector 3 consists of the connector body 5 and does not include any thermoplastic material. Rather, the first object 1 is of a thermoplastic composite material and the flow portion of thermoplastic material 4 shown in FIG. 22b stems from the matrix and is caused by the heat generated by driving the connector 3 into the material of the first and/or second objects while mechanical vibration acts on it.

In FIG. 22b, the connector is shown not to punch through the second object but, as explained referring to FIGS. 19a/19b, to be deformed within material of the second object 2.

FIG. 22b yet illustrates an optional step of after-treating the thermoplastic material 4 after the step of punching. This optional step is an option also for other embodiments, including embodiments in which the flow portion fully or partially comes from thermoplastic material of the connector. To this end, a sonotrode 6.2, in the depicted configuration a ring sonotrode different from the sonotrode used for the punching, is used to press against a surface of the first object (or optionally the second object) while mechanical vibrations are coupled into it until thermoplastic material that is solid (by not having been made flowable or that has re-solidified) becomes flowable (again). Thereby, ruptures, defects etc. that were caused by the punching may be leveled out.

This step of after-treating is also an option for embodiments in which the punching step is not vibration-assisted but a conventional punch riveting step and in which the first object material is a thermoplastic composite material. In these embodiments, in contrast to other embodiments described in this text, the mechanical vibration is not coupled directly into the connector, by a common coupling interface of the vibrating tool (sonotrode) and the connector but in the first object.

With respect to FIGS. 23a and 23b another optional feature is described, which optional feature generally pertains to embodiments in which the second object material has the property of being porous and/or inhomogeneous so that the material becomes penetrable by the effect of hydrostatic pressure. In the embodiment of FIGS. 23a and 23b the second object is assumed to be a foam, for example a metallic foam.

In accordance with this optional feature the flow portion of the thermoplastic material 4 is caused to penetrate into structures (especially pores) of the second object to form, after re-solidification, a positive-fit connection with the second object. To this end, an axial extension of the thermoplastic material portion may such that the thermoplastic material during the insertion process reaches into the second object material, as illustrated in FIG. 23a/23b. Reference number 41 denotes a part of the flow portion that has flown into structures of the second object.

The kind of connection is an example of a microscopic positive-fit connection that anchors the connector in the second object material. The same may, in addition or as an alternative, apply within material of the first object.

FIG. 24a depicts an alternative connector 3. The connector body 5 of the connector 3, similarly to the embodiment of 18a has an outer shape that forms a proximally facing shoulder 171, whereby the outer diameter (or, more generally, the outer dimension) is smaller at a more distal location than at a more proximal location. Thereby, a circumferential narrowing 172, here forming a waist, is formed proximally of the punching edge 52 portion of the connector body.

Especially, the punching edge 52 may be radially further out compared respect to the outer surface of connector body portion proximally of the shoulder 171.

A distance D between the shoulder 171 and a stop face defined by the head 51 is larger than the combined thicknesses of the first and second objects.

Due to this approach, the edge of the second object (and of the first object in the shown configuration) is not in physical contact with the outer surface of the connector body 5 after the connector body has punched through the first and second objects. Therefore, after the punching process itself there is a reduced tendency of mechanical vibration to be coupled into the second object, which may be beneficial especially if the second object is metallic and therefore a very good conductor of mechanical oscillation. A direct, force transmitting contact between the connector body and the second object if vibration is coupled into the connector could lead to mechanical vibration energy being coupled into the second object and absorbed at more remote locations instead of causing the desired liquefaction process of the thermoplastic material.

A connector of the kind shown in FIG. 24a therefore makes possible that the step of driving the connector into material of the first object and coupling mechanical vibration into the connector and/or the first object includes preventing the connector body from being clamped by the second object and/or by the first object after material of the second object and/or first object, respectively, has been punched out. This is schematically illustrated in FIG. 24b showing a detail of a section through the connector 3 after the process.

A further effect of the narrowing, in addition to preventing a vibration transmitting contact between the metallic second object 2 and the connector body 5 is that by the narrowing a compensation for differences in the coefficient of thermal expansion is created, preventing mechanical stress between the objects 1, 2 and the connector body 5. The thermoplastic material portion 4 thereby serves as a kind of dilatation ring taking up relative forces along the object plane, which relative forces could arise because of different thermal expansion.

A further feature of the embodiment of FIG. 24a, which further feature is independent of the narrowing 172 and may be implemented in other embodiments described in this text, including embodiments implementing the approach of FIGS. 19a-19b and 22a/22b (without a punching through the second object). Namely, the connector body forms a circumferential flow confining flange 175 that includes a distally protruding abutment portion impeding a thermoplastic material flow to lateral directions.

FIG. 25 shows a detail of a variant of the connector 3 of FIG. 24a. In this variant, the narrowing 172 is filled by the thermoplastic material portion 4. Because the thermoplastic material becomes at least partly flowable during the process, and because even portions that may not become flowable will be heated to a certain extent and thereby exhibit substantial internal friction, the thermoplastic material is, during the process, not an efficient vibration transmitter. Therefore, the above-described effect of the narrowing preventing coupling of too much vibration energy into the second object is not jeopardized by the thermoplastic material portion 4 filling the narrowing.

FIG. 26 shows a further variant, where the thermoplastic material portion extends distally to the shoulder 171 and proximally to the outermost section of the head 51 but is thinner compared to FIG. 25 and does not completely fill the narrowing 172.

Also, as an independent feature that can be combined with other features of embodiments of the present invention, the punching edge 52 is depicted to be slightly offset to radially-inwardly. However, the radial position of the punching edge 52 is still further out than the radial position of the outer surface of the connector body at the narrowing 172.

FIG. 27 shows a detail of an even further variant, where the thermoplastic material portion 4 has an outer surface radially-more outward than the punching edge. This variant may for example be suitable for embodiments in which the first object has a comparably low density and is capable of being penetrated by flowable thermoplastic material, or if a gap needs to be filled by the thermoplastic material.

Another, independent feature of the embodiment of FIG. 27, which can be combined with other features of embodiments of the present invention, is that the connector body includes a fastening indentation 177 filled by thermoplastic material of the thermoplastic material portion 4. Structures (indentations, protrusions) of this kind, which cause an interlocking between the connector body and the thermoplastic material, may have different shapes and distributions.

FIG. 28 shows a processing diagram of the process in an embodiment for example like the one of FIG. 19a/19b or 22a/22b that includes a step of deforming the connector body during and/or after punching (a clinching step). FIG. 28 shows the pressing force 181 and the vibration power 182 as a function of the time for the anchoring part of the process that follows a punching step, wherein it is assumed that after the punching step the required pressing force initially may be substantially reduced or switched off, for example after a well-defined portion of the first object (a cover layer or the entire first object) has been punched through. For the anchoring part, in the depicted example as soon as the force exceeds a trigger force T (point 183), the vibration is switched on. During an anchoring phase 185, the both, the pressing force and the vibration energy impinge, causing punching and liquefaction of the flow portion. When at least the first object is punched through and the thermoplastic material is sufficiently flowable, the clinching phase 186 follows. In embodiments, for this clinching phase 186 the pressing force is substantially raised compared to the anchoring phase. The transition between the anchoring phase 185 and the clinching phase 186 may be triggered by time (if the duration of the anchoring phase is well-known), a position reached by the tool by which the force and the vibrations are coupled into the system, or also by another parameter, for example a change in physical resistance, temperature, etc.

Similarly to the above-described curve including a clinching phase, a pressure peak towards the end of the process may also be present when a cold weld between the connector body and the second object is caused, as explained hereinbefore.

What is claimed is:

1. A method of bonding a connector to a first object, the method comprising the steps of:
providing the first object and the connector, the connector being separate from the first object, the connector extending between a proximal end and a distal end and comprising a connector body, the connector body comprising a distally facing punching edge at the distal end, wherein the connector further comprises, proximally of the punching edge, a thermoplastic material in a solid state, and wherein the connector body comprising the punching edge is of a material that is not liquefiable or liquefiable only at substantially higher temperatures than the thermoplastic material;
placing the connector relative to the first object so that the distal end is in physical contact with the first object;
driving the connector into material of the first object and coupling mechanical vibration into the connector and/or the first object, until the connector extends through a portion of the first object from a proximal side to a distal side thereof and material of the first object is punched out by the connector body, and until at least a flow portion of the thermoplastic material becomes flowable and flows relative to the connector body and the first object while the connector body remains solid; and
causing the flow portion of the thermoplastic material to re-solidify.

2. The method according to claim 1, wherein the portion of the first object through which the connector extends during the step of causing the flow portion to re-solidify is board-shaped.

3. The method according to claim 1, wherein the first object comprises non-liquefiable material.

4. The method according to claim 1, wherein the first object comprises a fiber composite material.

5. The method according to claim 1, comprising the further step of deforming the connector body to be expanded distally of the portion of the first object to anchor the connector in the first object.

6. The method according to claim 1, wherein the step of positioning comprises positioning a second object relative to the first object, and wherein in the step of being driven into material of the first object, the connector is also driven into or through the second object or an opening therein to connect the first and second objects to each other.

7. The method according to claim 6, wherein the second object is positioned distally of the first object.

8. The method according to claim 6, wherein the second object is of a fiber composite material or is metallic.

9. The method according to claim 6, wherein the second object in the step of positioning comprises a through opening.

10. The method according to claim 6, wherein in the step of being driven into material of the first object and into or through the second object, the connector punches through the second object to yield a punched through opening through which a portion of the connector extends.

11. The method according to claim 6, comprising the further step of deforming the connector body to be expanded distally of the second object, whereby the connector forms a rivet securing the first and second objects to each other.

12. The method according to claim 1, wherein the step of coupling mechanical vibration into the connector is carried out until material of the flow portion coats a circumferential wall of an opening in the first object caused by the punching at least along a full circumference.

13. The method according to claim 1, wherein the first object comprises electrically conducting material, and wherein the flow portion is caused to fully shield the electrically conducting material from the connector body.

14. The method according to claim 1, wherein the step of coupling mechanical vibration into the connector is carried out simultaneously with driving the connector into material of the first object.

15. The method according to claim 1, wherein the step of coupling mechanical vibration into the connector is carried out after the step of driving the connector into material of the first object.

16. The method according to claim 1, wherein the connector body comprises a proximally facing coupling-in face, and wherein the step of coupling mechanical vibration into the connector comprises pressing a vibrating tool against the coupling-in face.

17. The method according to claim 1, wherein the connector comprises an anchoring element initially separate from the connector body, wherein the anchoring element comprises the thermoplastic material, and wherein the step of coupling mechanical vibration into the connector comprises pressing a vibrating tool against a proximally-facing face of the anchoring element.

18. The method according to claim 17, wherein the connector body comprises a longitudinal opening open to the proximal side and at least one lateral exit opening connecting the longitudinal opening with a circumferential periphery of the connector body, and wherein the step of coupling mechanical vibration into the connector comprises pressing the anchoring element into the longitudinal opening by the vibrating tool.

19. The method according to claim 1, wherein the step of coupling mechanical vibration into the opening comprises pressing a first vibrating tool against a first coupling-in face and pressing a second vibrating tool against a second coupling-in face.

20. The method according to claim 19, wherein the steps of pressing the first and second vibrating tools are carried out sequentially.

21. The method according to claim 1, wherein the flow portion is caused to flow along an interface between the first object and the connector body.

22. The method according to claim 1, wherein the connector body comprises a head portion and wherein the step of driving the connector body into material of the first object is carried out until a distally-facing stop face of the head portion abuts against a proximally-facing surface of the first object or another item connected to the first object.

23. The method according to claim 1, wherein the punching edge of the connector body is formed by a blade-like distal portion.

24. The method according to claim 1, wherein the connector body comprises a first connector body part comprising the punching edge and a second connector body part, wherein the step of driving the connector into material of the first object comprises driving the first connector body part into material of the first object, and wherein the step of coupling mechanical vibration into the connector comprises pressing the second connector body part against the first connector body part and/or the first object while the mechanical vibration is coupled into the second connector body part and/or the first connector body part until the flow portion of the thermoplastic material becomes flowable.

25. The method according to claim 24, wherein one of the second and first connector body parts comprises the thermoplastic material and the other one of the first and second connector body parts comprises an abutment feature, and wherein thermoplastic material is pressed against the abutment feature in the step of pressing the second connector body part against the first connector body part.

26. The method according to claim 24, wherein the step of driving the first connector body part into material of the first object comprises coupling mechanical vibration into the first connector body part.

27. The method according to claim 26, wherein a different tool is used for coupling the mechanical vibration into the first connector body part and for pressing the second connector body part against the first connector body part and coupling mechanical vibration into the second connector body part.

28. The method according to claim 24, wherein the second connector body part in the step of pressing the second connector body part against the first connector body part while the mechanical vibration is coupled into the second connector body part and/or the first connector body part is fastened to the first connector body part.

29. The method according to claim 24, wherein the second connector body part is ring-shaped and after the step of pressing the second connector body part against the first connector body part while the mechanical vibration is coupled into the second connector body part and/or the first connector body part encompasses a portion of the first connector body part.

30. The method according to claim 24, wherein the first connector body part comprises a longitudinal opening open to the proximal side and at least one lateral exit opening connecting the longitudinal opening with a circumferential periphery of the connector body and wherein the step of pressing the second connector body part against the first connector body part while the mechanical vibration is coupled into the second connector body part and/or the first connector body part comprises pressing the second connector body part into the longitudinal opening.

31. The method according to claim 1, further comprising causing a portion of the connector body to be spread prior to and/or during making the flow portion flowable, whereby a lateral surface of the connector is pressed against an inner surface of an opening in the first object caused by the punching.

32. The method according to claim 31 comprising using a separate spreading element for causing the portion of the connector body to be spread.

33. The method according to claim 31, wherein the connector body has an inner hollow space open to the proximal side, and wherein the inner hollow space is dimensioned so as to be insufficient for accommodating the punched-out material of the first object, whereby punched-out material of the first object causes a spreading of a connector body portion surrounding the inner hollow space.

34. The method according to claim 1, wherein the connector body is subject to a tensile force after punching and during coupling mechanical vibration into the connector and during coupling mechanical vibration into the connector until at least a flow portion of the thermoplastic material becomes flowable.

35. The method according to claim 1, wherein the connector body is metallic.

36. The method according to claim 1, wherein the mechanical vibration is coupled directly into the connector via an interface between a vibrating tool and the connector.

37. The method according to claim 1, wherein the connector body has a distal punching edge portion and proximally thereof a narrowing where an outer dimension is reduced compared to an outer dimension of the distal narrowing.

38. The method according to claim 37, wherein the punching edge has a position radially more outward than an outer surface of the connector body at axial positions of the narrowing.

39. The method according to claim 37, wherein the thermoplastic material portion forms a collar around the narrowing of the connector body.

40. The method according to claim 39, wherein an axial extension of the collar corresponds to at least a thickness of the first object.

41. The method according to claim 37, in which the step of positioning comprises positioning a second object distally of the first object, wherein in the step of being driven into material of the first object, the connector is also driven through the second object yielding a second object opening, and wherein the step of driving the connector into material of the first object and driving the connector through the second object and coupling mechanical vibration into the connector comprises moving the connector to a position where a rim of the second object opening is adjacent the narrowing.

42. The method according to claim 1, in which the step of positioning comprises positioning a second object distally of the first object, wherein in the step of being driven into material of the first object, the connector is also driven through the second object, the method comprising preventing the connector body from being clamped by the second object after it has been driven through the second object.

43. A method of connecting to a first object and a second object, comprising:
  providing the first object, the second object and a connector, the connector, the first object and the second object all being separate from each other, the connector extending between a proximal end and a distal end and comprising a connector body, the connector body comprising a distally facing punching edge at the distal end, wherein the connector further comprises, proximally of the punching edge, a thermoplastic material in a solid state, and wherein the connector body comprising the punching edge is of a material that is not liquefiable or liquefiable only at substantially higher temperatures than the thermoplastic material;
  placing the first object, the second object and the connector relative to one another, so that a sheet portion of the second object is distally of a sheet portion of the first object and the connector is in physical contact with the first object and/or the second object;
  driving the connector into material of the first object and/or the second object into a distal direction and coupling mechanical vibration into the connector, until the connector extends through a portion of the first object and through a portion of the second object and material of the first object and/or the second object is punched out by the connector body, and until at least portions of the thermoplastic material become flowable and flow at least at an interface between the connector and the first object while the connector body remains solid; and
  causing the thermoplastic material to re-solidify.

44. A connector for being bonded to an object, the connector comprising a thermoplastic material and a connector body of a material that is not liquefiable or liquefiable only at substantially higher temperatures than the thermoplastic material, the connector body extending between a proximal end and a distal end along a proximodistal axis and comprising a distally facing punching edge at the distal end, wherein the thermoplastic material is arranged around a periphery of the connector body at locations proximally of the punching edge.

45. The connector according to claim 44, wherein the distal end of the connector body is deformable by bending outwardly with respect to the axis under the effect of a pressing force.

46. The connector according to claim 44, wherein the thermoplastic material forms a collar around a proximodistal axis of the connector body.

47. The connector according to claim 44, wherein the connector body comprises indentations along a periphery and wherein the thermoplastic material is arranged at least in part in these indentations.

48. The connector according to claim 44, wherein the connector has a tapering portion proximally of the punching edge.

49. The connector according to claim 44, comprising a hollow space open to the distal side for accommodating punched-out material, whereby the punching edge is a distal end of a blade-like connector body portion.

50. The connector according to claim 49 having an essentially tube-shaped portion distally ending in the punching edge.

51. The connector according to claim 50, wherein the tube-shaped portion comprises at least one axially running slit.

52. The connector according to claim 44, wherein an outer contour of the connector body does not have circular symmetry.

53. The connector according to claim 44, further comprising a head portion.

54. The connector according to claim 53, wherein the head portion is a head portion of the connector body.

55. The connector according to claim 44, wherein the connector body comprises a first connector body portion and a second connector body portion, the first and second connector body portions being movable with respect to each other.

56. The connector according to claim 55, wherein the first and second connector body portions are shaped to be fastened to each other by a press fit and/or by a positive-fit connection with the thermoplastic material.

57. The connector according to claim 44, wherein the connector body is metallic.

58. The connector according to claim 44, wherein the connector body comprises a distal punching edge portion with the punching edge, and proximally thereof a narrowing with a reduced radial dimension compared to the punching edge portion.

59. The connector according to claim 58, wherein a position of the punching edge is located radially more outward than the outer surface of the connector body at the axial position of the narrowing.

60. The connector according to claim 58, wherein the thermoplastic material portion forms a collar around the narrowing.

* * * * *